United States Patent [19]

Groen et al.

[11] Patent Number: 5,304,036
[45] Date of Patent: Apr. 19, 1994

[54] AUTOGYRO AIRCRAFT

[75] Inventors: Henry J. Groen; David L. Groen, both of Salt Lake City, Utah

[73] Assignee: Sego Tool, Incorporated, Salt Lake City, Utah

[21] Appl. No.: 626,972

[22] Filed: Dec. 12, 1990

[51] Int. Cl.$^5$ ................. B64C 27/43; B64C 27/59
[52] U.S. Cl. ..................... 416/102; 416/135; 416/138; 416/148; 416/168 R; 244/17.25; 244/224; 244/233
[58] Field of Search ............... 416/98, 102, 118, 131, 416/135, 138, 147, 148, 159, 168 R; 244/8, 17.11, 17.25, 220, 221, 224, 233

[56] References Cited

U.S. PATENT DOCUMENTS

| | | | |
|---|---|---|---|
| 2,080,522 | 5/1937 | Wilford et al. | 416/118 |
| 2,534,353 | 12/1950 | Hiller et al. | 416/176 A |
| 3,193,019 | 7/1965 | Drees et al. | 416/102 |
| 3,228,479 | 1/1966 | Nagler | 416/138 A |
| 3,556,674 | 1/1971 | Foote | 416/168 |
| 4,071,206 | 1/1978 | Magill | 244/8 |
| 4,741,672 | 5/1988 | Breuner | 416/148 |

FOREIGN PATENT DOCUMENTS 86463  10/1957  Netherlands ............ 416/102

Primary Examiner—Edward K. Look
Assistant Examiner—James A. Larson
Attorney, Agent, or Firm—Trask, Britt & Rossa

[57] ABSTRACT

An autogyro aircraft has freewheeling rotor blades that provide lift. A separate pusher propeller provides forward thrust. The rotor system (20) has a collective arm (30) as a control for selectively setting and maintaining a tension force on a collective cable to regulate the rotor blade angle of attack or pitch angle between a no-lift attitude and a positive lift angle. The collective arm (30) sets a tension on collective cable against a coil spring biasing. The collective arm is connected to pivot or tilt a pitch change horn assembly and, in turn, connected rotor blades. The collective arm can be selectively set and maintained and released and reset both on the ground and in flight.

16 Claims, 10 Drawing Sheets

AUTOGYRO AIRCRAFT

BACKGROUND OF THE INVENTION

1. Field of the Invention

This invention relates to aircraft and particularly to autogyro aircraft with a freewheeling rotor which serves as the lifting surface for the aircraft. More specifically, this invention relates to control arrangements including a system for maintaining the pitch or angle of attack of the blades of the freewheeling rotor.

2. Prior Art

An autogyro aircraft derives its lift from a freewheeling, unpowered rotor with horizontal thrust provided by a separate engine turning a standard fixed wing type aircraft propeller. The autogyro is neither an airplane nor a helicopter. Rather, it incorporates a freewheeling rotor in place of a fixed wing. An airflow passing upwardly through the rotor blades provides lift in autorotation. A second generation autogyro is provided for bringing the rotor blades up to flight speed with the aircraft on the ground.

U.S. Pat. No. 1,590,497 to a Juan de la Cierva of Madrid, Spain illustrates a first embodiment of an autogyro aircraft. De la Cierva was a prolific inventor, patenting a number of improvements in autogyro systems both in the United States and abroad and was issued at least nine United States patents in the area of autogyro aircraft. None of which patents, however, involved apparatus for providing selective control of rotor blade angle of attack as does the present invention.

The de la Cierva autogyro was followed by improved versions that were embodied in a number of patents as were issued to H. F. Pitcairn from 1927 to 1956 that taught improvements upon the de la Cierva design and ultimately evolved into a helicopter-type aircraft. As an evolution from the de la Cierva aircraft, H. F. Pitcairn developed and marketed an autogyro known as a PCA2. PCA stood for Pitcairn Cierva Aircraft.

The helicopter aircraft of Pitcairn had a powered rotor system with the capability for selectively changing the rotor blade angle of attack to provide a steering capability as well as a forward thrust component for forward flight. The arrangement for selectively changing rotor blade angle of attack for a turned rotor is commonly known as a swashplate and provides for altering the blade of attack through a full three hundred sixty degrees (360°). Of course, a helicopter rotor structure must also have a capability for selectively tilting the rotor mast. This rotor mast tilting is from the vertical to an angle where, in conjunction with the action of the swashplate, there is provided a forward thrust component to move the vehicle horizontally as the rotor blades provide lift. A forward thrust component is not required for an autogyro rotor system, as the autogyro aircraft incorporates a separate propeller for this purpose.

Both de la Cierva and Pitcairn ultimately recognized the desirability of providing for changing, between limits, the rotor blade pitch or angle of attack for pre-takeoff spin up of the autogyro rotor. After spin up, the rotor blade angle of attack could be changed from a neutral non-lifting angle to a lifting attitude facilitating the aircraft lifting off after only a short takeoff roll distance.

In U.S. Pat. No. 1,947,901, de la Cierva to set the rotor blades in a positive lift angle of attack prior to turning the rotor. Similarly, Pitcairn, in U.S. Pat. No. 1,977,834, also shows a sleeve arrangement for pre-setting a rotor blade angle of attack. Shifting the rotor blade pitch angle during rotation of the blades was recognized by Pitcairn in U.S. Pat. No. 1,884,847. This capability, however, was between limits and, unlike the present invention, did not provide for incrementally changing rotor blade angle of attack prior to and during flight.

As noted earlier, the autogyro lead to and was replaced by the helicopter as a preferred aircraft. The helicopter replaced the free-spinning rotor of the autogyro with a driven rotor system that included structure for both canting the turning rotor mast as well as for altering the angle of attack of the rotor blades. A tail fan system was also incorporated to control yaw. These developments are shown in U.S. Pat. Nos. 2,247,034; 2,311,247; 2,350,126; 3,352,342; 2,352,404; 2,473,299; and 2,499,161.

With the development of the helicopter, a vertical takeoff and landing capability was achieved along with the ability to hover. Because the autogyro aircraft could not hover, the autogyro lost favor, and further development efforts ended. However, the autogyro has benefits which may be more appropriate for selected uses so that a practical autogyro, as contemplated by the present invention, is now viable.

Following the efforts of de la Cierva and Pitcairn to the present, autogyro aircraft improvements have essentially been refinements to early structure. For example, a patent by Salisbury, et al., U.S. Pat. No. 1,838,327, shows an early system for altering rotor blade angle of attack. U.S. Pat. No. 2,154,601 (Bennett) shows a system for changing rotor blade angle from a no-lift pitch to a lifting pitch as the rotor is rotated to takeoff speed. Like the earlier cited Pitcairn systems, this alteration of rotor blade pitch angle is accomplished between preselected limits rather than being incrementally controllable as with the present invention.

U.S. Pat. No. 4,092,084 (Barltrop) is also directed to a system for changing rotor blade pitch angle. Rotor blade pitch angle changes occur in relation to a rotor rotation rate. The blade angle changes between set limits. A rotor blade pitch angle control is also shown in U.S. Pat. No. 3,149,802, (Wigal). Like the Barltrop patent, Wigal shifts the rotor blade pitch angle between limits responsive to an increase in rate of rotation of the rotor. U.S. Pat. No. 3,465,705 (Bensen) is directed to a system for diverting engine power to rotate a rotor from rest to a takeoff rotation rate. The rotor blades cant between limits responsive to rotation rate of the rotor. U.S. Pat. No. 2,183,119 (Larsen) also shows a system for rotating a rotor from a rest position to a takeoff rotation rate.

None of the autogyro aircraft described in the above-referenced patents or autogyros known to applicants have a unidirectional control mechanism for variable control of an autogyro rotor in flight to control the pitch angle of the leading edges of oppositely disposed rotor blades and, in turn, the lift of an autogyro. U.S. Pat. No. 4,195,800 (Wallace) shows a helicopter collective system for changing the angle of attack of rotor blades of a rotor system during a period of rotation of the rotor and mast through a full circle of three hundred sixty degrees (360°).

Summarizing, some autogyro aircraft heretofore known have an automated arrangement for pivoting the rotor blades from a no-lift to lift attitude on reaching a certain rotation rate. The rotor blades may be rotated either through linkage to an aircraft engine or by taxiing the aircraft under the urging of a conventional engine turning a propeller to spin up the rotor blade to a desired rotation rate to in turn provide takeoff lift. In such systems, centrifugal forces increase with the rotation rate and typically act upon a structure to cause the blade angle of attack to change between a first no-lift position and second lift or takeoff position. No system provides for selective control of rotor blade pitch angle or angle of attack independent of the rotor blade rotation rate.

SUMMARY OF THE INVENTION

It is a principal object of the present invention to provide a selective, incremental rotor blade pitch angle control system for a freewheeling rotor system of an autogyro aircraft that includes oppositely disposed blades that project equidistantly from a hub, the control system for incrementally adjusting rotor blade pitch or angle of attack from a no-lift position to a positive lift position at any time during rotor turning.

Another object of the present invention is to provide a rotor blade pitch control system that allows a pilot to incrementally change the angle of attack or angle of lift of opposite rotor blades of a freewheeling rotor system of an autogyro aircraft, both on the ground and in flight, utilizing a control arrangement that is convenient to the pilot that allows that pilot to both select and maintain the rotor blade angle of attack and provides for releasably locking in place that rotor blade angle of attack position.

Another object of the present invention is to provide a control system for allowing a pilot to selectively set, incrementally between limits, the autogyro aircraft rotor blade angle of attack.

Still another object of the present invention is to provide a control system for incrementally controlling the angle of attack of oppositely disposed rotor blades of an autogyro aircraft that is operated through a single cable connected between a control and the autogyro rotor system that is opposed by a binding structure and aerodynamic forces as occur in flight.

Still another object of the present invention is to provide a rotor blade angle of attack control system for selectively altering the blade angle of attack of oppositely dispensed blades of a freewheeling autogyro aircraft rotor that is simple and reliable to operate by an operator or pilot of that autogyro aircraft.

In accordance with the above objects, the present invention is in an autogyro rotor blade pitch angle control system for incrementally altering the leading edge angle of attack of oppositely disposed rotor blades that extend outwardly from a center hub. The rotor is freewheeling, spinning under the urgings of an upward passage of air therethrough providing lift to the aircraft and includes at least two equally spaced, oppositely facing blades that extend at right angles from a spindle. The invention enables a pilot to incrementally change the pitch or angle of attack of the opposed rotor blade leading edges within approximately ten degrees (10°) of arc between no-lift and lift attitudes.

The autogyro rotor assembly or system is mounted to freewheel on an upright mast that extends vertically from the autogyro aircraft fuselage. The mast is located to provide a proper aircraft center of gravity as required for stable flight. The freewheeling rotor includes a pair of oppositely disposed rotor blades that extend from a teeter bar assembly that is mounted to tilt relative to the rotor spindle. Each rotor blade is mounted to the teeter bar assembly that extends between ends of a pair of cheek plates that are arranged parallel to one another on opposite sides of the spindle and receive a rod fitted therethrough and laterally through the spindle, providing a tilting coupling of the cheek plates to the spindle. The rotor spindle is journaled to freewheel or pivot on the upright mast end. The teeter bar assembly is fixed to and between the cheek plates and mounts the rotor blade ends sandwiched between pairs of pitch change horn plates that are supported on spherical bearings between top and bottom teeter bars that are fixed at their ends between the cheek plates. The pitch change horn plates are thereby mounted by spherical bearings to tilt or pivot relative to the top and bottom.

The pairs of pitch change horn plates each include a coplanar arm that extends outwardly therefrom. The individual pitch change horn arm is, in turn, pivotally connected to an end of a linkage consisting of a pair of links. The pitch change horn arm linkage is coupled on its opposite end to one of a pair of pitch teeter compensator bearings journaled on rods or bolts that extend oppositely at normal angles from the rotor spindle. In turn, the other pitch teeter compensator bearing connects through a pair of links to one side or arm of a pitch change cross arm. The pitch change cross arm, in turn, is connected to a collective cable end that is threaded through a retaining bolt that is fitted through the rotor spindle. The collective cable is arranged to move vertically responsive to the collective cable being drawn through the retaining bolt. The pulling of which collective cable end into which rotor spindle is opposed by a spring biasing that opposes travel of the pitch teeter compensator bearings along the rods or bolts.

As described above, the pitch change cross arm is moved vertically by pulling the collective cable into the rotor spindle against the spring biasing and the aerodynamic forces as occur in flight. Tension on the collective cable is manually applied by a pilot moving a ratcheting pitch control or collective arm pivotally mounted in the cockpit area. The pitch control or collective arm is arranged such that when a pilot holding a handle end lifts that arm, the collective cable will pull the pitch cross arm towards the rotor spindle top. This travel of the pitch change cross arm ultimately pivots the rotor blade leading edges to a certain or select positive angle of attack. Upon release of the collective cable tension by the pilot lowering the pitch control or collective arm, the spring biasing and the aerodynamic forces will tend to urge the pitch change cross arm away from the rotor spindle top. This pivots through the links and pitch teeter compensator bearings, the pitch change horns and rotor blade ends secured thereto, back to the attitude where the rotor blade leading edge is at, essentially, a no-lift attitude.

The collective cable at the pitch control or collective arm connects between parallel arms or sides of a "U"-shaped yoke member that is secured at its web to a rod that is journaled in the aircraft fuselage. The pitch control or collective arm turns the rod about its longitudinal axis, with the yoke member turned therewith, applying tension to the collective cable and includes a releasable locking arrangement that is released by the pilot depressing a button that projects outwardly from a hand engaging end. A relaxing of tension on the collective cable occurs when the pilot lowers the pitch control or collective arm with the spring biasing and the aerodynamic forces as occur in flight then urging the pitch change cross arm to move away from the rotor spindle top to where the pitch change horn arms on the teeter bar assembly pivot the rotor blades back to essentially a flat, no-lift attitude.

DESCRIPTION OF THE DRAWINGS

In the drawings:

FIG. 14 is a perspective view of portions of a brake system of the autogyro of the invention.

DETAILED DESCRIPTION

Figure 1:
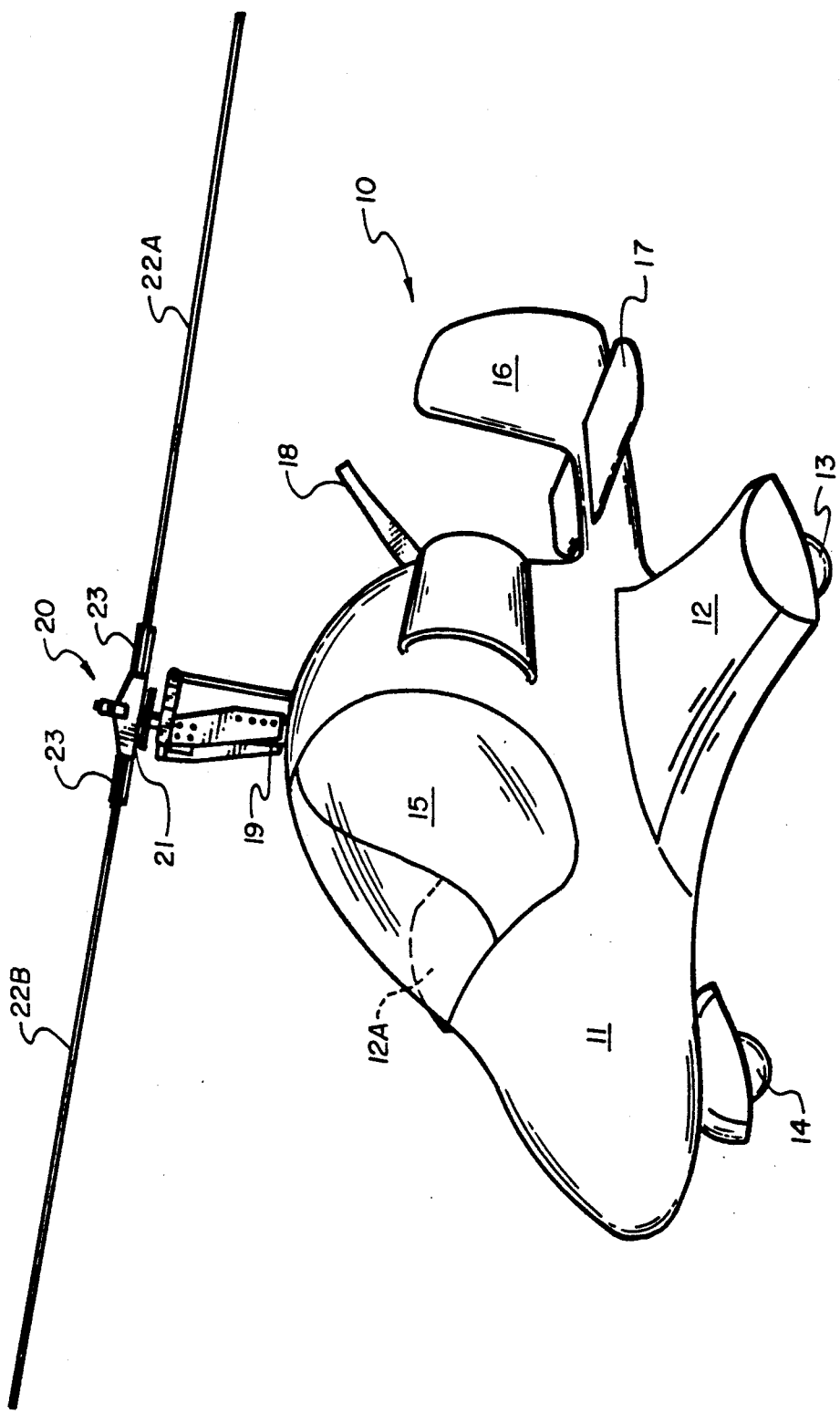
FIG. 1 is a side elevational perspective view of an autogyro aircraft of the present invention.

FIG. 1 shows a perspective view of an autogyro aircraft 10 of the present invention. The autogyro 10 has an exterior or fuselage 11, which fuselage has been removed in FIG. 2. In FIG. 1, the autogyro 10 is shown to include a left winglet 12 and a right winglet 12A. The winglets 12 and 12A are coplanar and extend outwardly from a mid-portion of the fuselage 11. The winglets 12 and 12A cover a support structure for left and right main wheels 13 and 13A (not shown). The fuselage 11, at the bottom of the nose portion, includes a front or nose wheel 14 extending therefrom. The nosewheel 14 with the left and right wheels 13 and 13A are the landing gear of the autogyro 10.

The fuselage 11 also includes a plexiglass-type windscreen 15 positioned across a forward portion of the aircraft cockpit. A rudder 16 and horizontal stabilizer 17 are shown arranged at right angles to one another, mounted to extend from a rear or tail portion of fuselage 11.

Horizontal thrust is provided to the autogyro 10 by operation of an aircraft engine turning a propeller 18. Autogyro 10 includes an upright mast 19 whereon rotor system 20 is mounted in freewheeling arrangement. The rotor system 20 includes a spindle 21 wherefrom is disposed oppositely-facing rotor blades 22A and 22B that are mounted thereto to be coplanar and extend oppositely from teeter bar assembly 23. The rotor system 20 vertically tilts the teeter bar assembly and rotor blades relative to the spindle 21 to compensate for dissimilarities of lift and for pivoting the rotor blades leading edges between no-lift and lift attitudes as will be set out in detail later herein.

Figure 2:
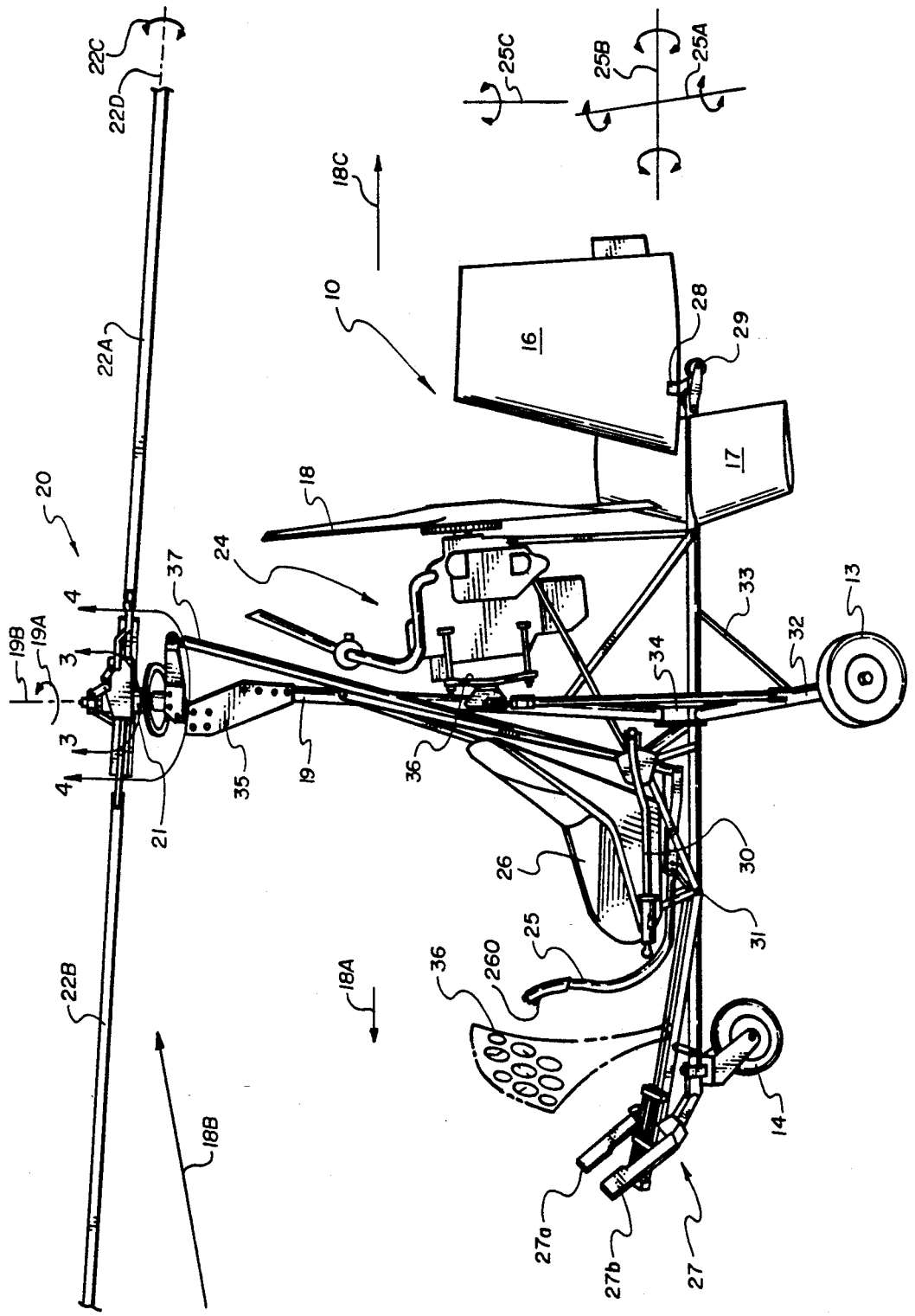
FIG. 2 is a partial side elevational view of the autogyro aircraft of FIG. 1 with the exterior removed therefrom and a control panel shown in broken lines.

FIG. 2 shows the autogyro 10 of FIG. 1 absent the fuselage 11 to expose the aircraft frame, controls and linkages. Engine 24 is mounted to the frame and extends rearwardly from mast 19. The engine turns the propeller 18 to urge the autogyro forwardly 18A by rearward thrust. FIG. 2 also shows a control stick 25 to be operated by a pilot seated on a seat 26 so as to straddle that control stick. The control stick 25 is linked to the rotor system for tilting that rotor system relative to the head end of mast 19. In operation, a pilot manipulates control stick 25 to tilt the rotor system so as to control the aircraft around its pitch axis 25A and roll axis 25B. The rudder 16 or vertical stabilizer provides for controlling the autogyro 10 around its yaw axis 25C. Rudder 16 is pivotally coupled to the aircraft frame at 28 so as to pivot under the control of the pilot operating a rudder control assembly 27. The rudder control assembly includes rudder pedals 27A and 27B whereon the pilot rests his feet. In operation, for example, a pilot depressing the right pedal 27A will pivot rudder 16 so as to cause the rear or trailing edge thereof to move to the right, moving the autogyro tail to the left and the aircraft nose to the right. In turn, a pilot depressing the left rudder pedal 27B will move the aircraft nose to the left.

FIG. 2 shows the pilot seat 26 positioned back from the control stick 25 with a pitch control arm 30 shown arranged along the left side thereof. The function of the pitch control arm or collective arm 30 is for selectively setting the pitch angle or angle of attack of the oppositely disposed rotor blades 22A and 22B leading edges and will be discussed in detail hereinbelow with respect to a discussion of FIGS. 3 through 5.

Shown best in FIG. 2, the autogyro 10 includes a frame made up of frame members that are preferably both square and round tubing and includes a center or keel tube 31. The keel tube 31 mounts a main axle tube 32 that extends from either side thereof and is secured at a right angle and mounts, on the ends thereof, the main wheels 13 and 13A. The nose wheel 14 is mounted to extend downwardly from a forward end of that keel tube 31. The rudder 16 is pivotally mounted at 28 to extend vertically from the rear end of the keel tube 31. Also mounted to the keel tube 31 is the horizontal stabilizer 17 that, it should be understood, is fixed in place at an angle from the horizontal to provide a design lift as a counterbalance to the weight of the autogyro forward of the aircraft center of gravity.

Drag braces 33 are connected on their ends between the main axle tube 32 and the keel tube 31. The mast 19, that is also preferably a tube, is supported to the keel tube from a strut 34 and includes mast head end cheek plates 35 secured thereto. A mounting bracket 36 is secured to mast 19 whereto is mounted the engine 24 turning propeller 18. The engine 24 is preferably a standard aircraft type engine that incorporates a dual magneto system, an alternator system for supplying electrical power, an exhaust system, and may be geared or ungeared as required. An aircraft engine known as a Teledyne/Continental 0-200 rated at 100 horse power manufactured by Teledyne/Continental Motors has been found in practice to function properly as engine 24 for powering autogyro 10.

Controls and indicators to include an engine fuel/air mixture control, switches and gauges that show the status of the engine 24 are displayed on a control panel 36 that is shown in broken lines in FIG. 2. A pilot seated in seat 26, by moving the control stick 25 forward, rearward, and from side to side, moves push/pull tubes 37 vertically to tilt the rotor system 20 both laterally and longitudinally. Such rotor system 20 is mounted on the mast 19. Autogyro 10 control is thereby provided around the aircraft pitch and roll axis by tilting rotor system 20 with control of the aircraft around its yaw axis provided by movement, as described, of the rudder 16 operated by the pilot through the right and left rudder pedals 27A and 27B. The winglet 12, as shown in FIG. 1, does not effect control and is provided as a cover and for component mounting. Also, some lift may be provided upon forward movement as well as reduction in drag.

As set out above, a pilot seated in seat 26 operates rudder pedals 27A and 27B and stick 25 to control the autogyro 10 around its pitch, roll and yaw axis with the engine 24 providing thrust to move the aircraft horizontally with lift provided by passage of an airflow up through the turning rotor blades 22. The lift generated by the opposed rotor blades 22 is governed by the blade angle of attack or the angle of the blade cord to the plane of the turning rotor blades, the relative wind generated by blade turning contacting the blade leading edge and passing thereover generating lift. The present invention is directed to rotor system 20 and the control linkage for operation by the pilot whereby the pilot can selectively control the opposed rotor blades pitch angle from a no-lift angle of attack to a positive angle. In operation, the pilot manipulating the collective arm 30 can set and adjust that rotor blade angle of attack at any time during autogyro operation from takeoff to landing. This control of the rotor blade pitch angle is not dependent upon the speed of turning of the opposing rotor blades. Such pitch angle control can be set and locked in place as the pilot desires and can then be easily released and reset at any time during flight.

Affording the pilot with a capability for adjusting and setting the rotor blade angle of attack during operation makes the aircraft more responsive in flight. For example, increasing or decreasing that blade angle of attack produces an immediate lifting or settling of the aircraft, which response is in addition to pitch and roll changes derived from tilting the rotor system as controlled by the pilot with control stick 25. Further, affording the pilot with selective rotor blade angle of attack control allows him to maintain the rotor blade angle of attack in a no-lift configuration with pre-rotating the rotor system turning to a takeoff rotation rate or greater. Thereafter, the pilot, operating the collective arm 30, is able to pivot the rotor blades to a positive lift condition. The aircraft will then lift off with only a short takeoff roll. Also, for an optimally loaded aircraft, by pre-rotating the rotor blades to a greater than takeoff rate of turning and then moving the rotor blades to a maximum lift configuration, the aircraft will more quickly lift off and immediately initiate a climb.

Figure 3:
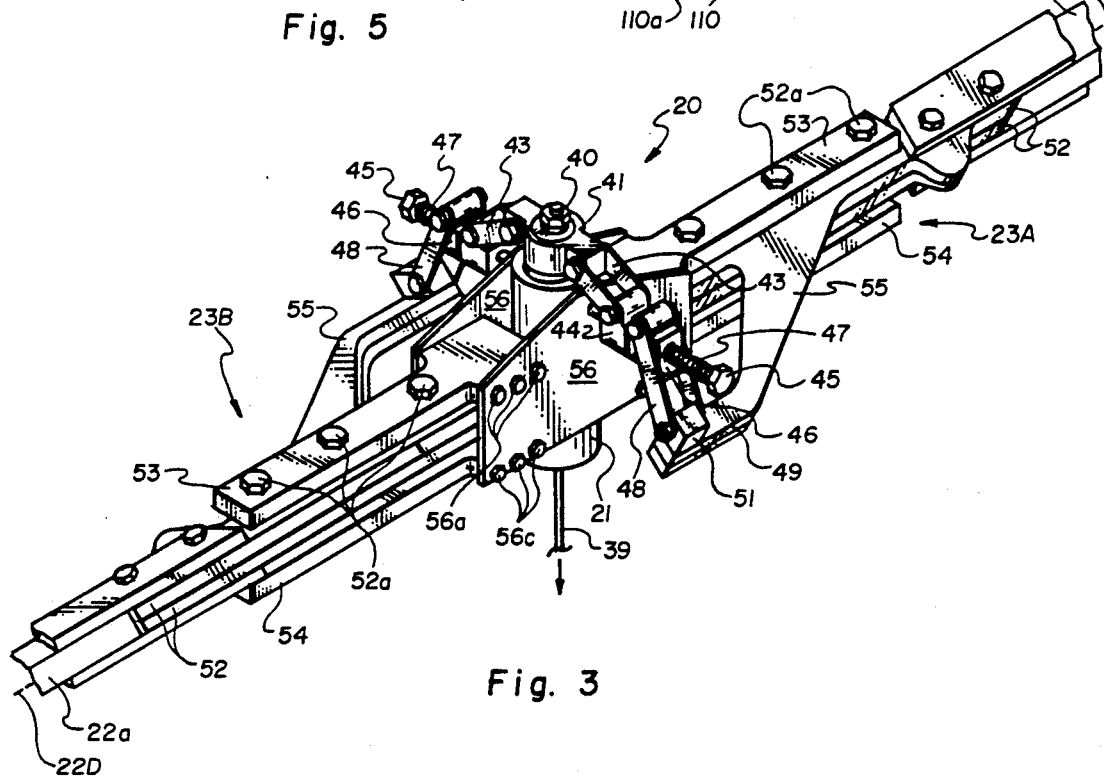
FIG. 3 is an enlarged profile perspective sectional view taken within the line 3—3 of FIG. 2 of the rotor assembly above a pre-rotation ring gear showing the rotor blades broken away.
Figure 4:
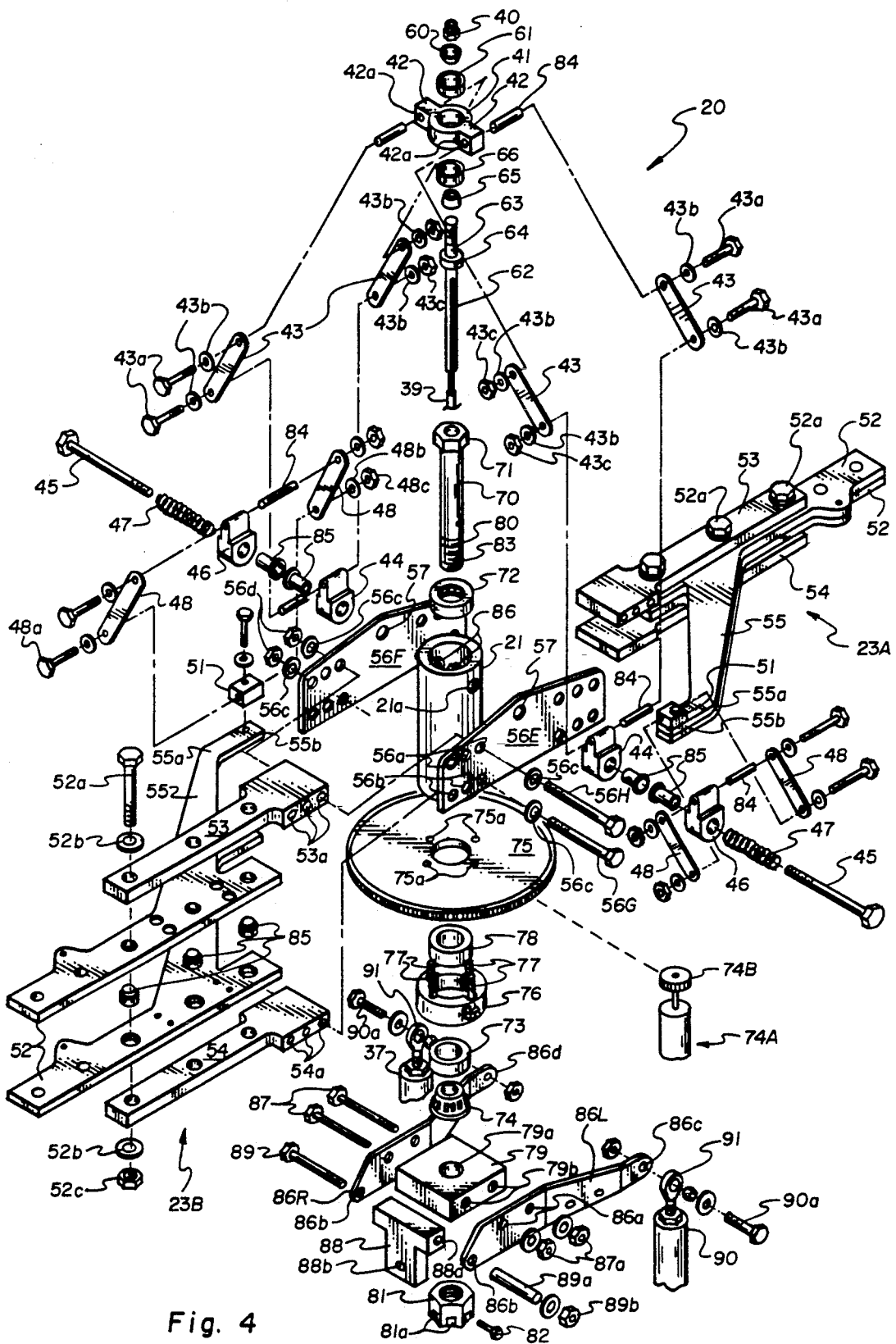
FIG. 4 is an exploded sectional view taken within the line 4—4 of FIG. 2 showing the rotor assembly of FIG. 3 and further including the pre-rotation ring gear and the mast head mount components thereof.

Shown in FIGS. 3 and 4, the rotor system 20 includes a collective cable 39 that is threaded through spindle 21 and ending in a collective cable end 62 that is threaded at end 63 to receive a retaining nut 40 turned thereover which is fitted through and journaled to move vertically a pitch change cross arm 41 as the collective cable is shortened. The pitch change cross arm 41 includes a pair of oppositely facing pitch change linkage arms 42 that are each bored laterally therethrough at 42A. Pitch change linkage arms 42 each receive, fitted to opposite sides thereof, ends of a pair of links 43. The links are pivotally coupled thereto by fitting bolts 43A through holes in the link ends, through oil bushings 84 and linkage arm holes 42A, with nuts 43B turned over the bolt ends. The opposite ends of which links 43 are pivotally coupled to opposite sides of one of a pair of first pitch teeter compensator bearings 44, hereinafter referred to as first compensator bearings. Each of the first compensator bearings 44 is longitudinally holed and receives a flanged oil bushing 85 fitted therein that receives, to slide along, a teeter bolt 45. Each teeter bolt 45 includes a head end and an opposite threaded end, the threaded end to be fitted through a center apex hole 57 formed through a cheek plate 56 and through one of a pair of aligned lateral holes 21A formed through spindle 21. Each teeter bolt 45 receives a nut 86 turned thereover within spindle 21, the bolts extending oppositely and at right angles outwardly from the side of the cylindrical spindle 21. Each teeter bolt 45 thereby suspends the cheek plates and components connected thereto such as the teeter bar assemblies 23, as set out below, to the spindle 21. Thereby the rotor blades, as they turn, are allowed to tilt up and down relative to spindle 21 so as to compensate for dissymmetrics of lift.

A second pair of pitch teeter compensator bearings 46, each hereinafter referred to as a second compensator bearing, are shown in FIGS. 3 and 4 fitted to slide along teeter bolts 45. Each second compensator bearing 46, like the first compensator bearing 44, is holed longitudinally and has a flanged oil bushing 85 fitted therein wherethrough a teeter bolt 45 is fitted. So arranged, the juxtapositioned faces of the first and second compensator bearings 44 and 46 will slide over one another responsive to the tilting or teetering of the cheek plates 56 relative to their teeter bolt 45 coupling to spindle 21. This tilting or teetering of the cheek plates 56 and teeter bar assemblies 23 translates to the second compensator bearing 46, whereas the first compensator bearing 44 is maintained steady as the rotor blades 22 climb on the advancing side and dip on the retreating side during rotation.

The juxtapositioned first and second compensator bearings 44 and 46 are arranged to one another, the opposing faces of each to slide freely over one another, each to slide independently along teeter bolt 45. A spring biasing of the second compensator bearing 46 towards the juxtapositioned first compensator bearing 44 is provided by a coil spring 47 wherethrough the teeter bolt 45 is fitted. The coil spring 47 ends are arranged to engage, respectively, a face of the second compensator bearings 46 and the undersurface of the teeter bolt 45 head. Each coil spring 47 is provided to urge the juxtapositioned first and second compensator bearings towards the cylindrical surface of spindle 21 which spring biasing opposes a force as applied by the collective cable 39, pulling the pitch change cross arm 41 into spindle 21.

In operation, an application of a tension force on collective cable 39 tends to draw the pitch change cross arm 41 towards the top of the spindle 21. The pairs of links 43 accordingly move therewith to push the first compensator bearing 44 outwardly away from spindle 21. This first compensator bearing 44 pushes against to move outwardly the second compensator bearing 46 against the biasing of coil spring 47. During this travel against the biasing of coil spring 47, the juxtapositioned faces of the first and second compensator bearings 44 and 46 move over one another responsive to the up and down tilting movement of the rotor blades 22 as they advance and retreat. So arranged, a second pair of links 48, that pivotally connect on their ends to the second compensator bearings 46, are moved also. The opposite ends of each of which pair of links 48 are pivotally connected to a mount 51 portion of the teeter bar assembly 23.

The teeter bar assembly 23 will be described in greater detail later herein but briefly includes top and bottom teeter bars 53 and 54. The top and bottom teeter bars 53 and 54, respectively, are fixed between the cheek plates 56 extending oppositely parallel and at right angles from the ends thereof. The teeter bar assembly 23 further includes pairs of pitch change horns 52, each pair pivotally sandwiched between the top and bottom teeter bars 53 and 54. The pitch change horns 52 each include a planar, outwardly angled pitch change arm 55 that is doglegged at 55A and ends in a mounting end 55B whereto the mount 51 is secured. The longitudinal axis of which pitch change arms 55 and mounting ends 55B thereof are parallel. So arranged, a vertical translation of the mounting end 55B will tilt also the pitch change horns 52. The pairs of pitch change horns 52 are identical, and each pair maintains root ends 22C and 22D of rotor blades 22A and 22B sandwiched therebetween. The pitch change horns 55 and sandwiched rotor blade root ends are mounted on spherical bearings 85 between the top and bottom teeter bars 53 and 54, respectively, to tilt with respect thereto. To provide this tilt, mounting bolts 52A with washers 52B that have threaded ends to receive nuts 52C turned thereover are fitted through spaced apart aligned holes that are formed through the top and bottom teeter bars 53 and 54 and through the spherical bearings 85 that are seated in recesses in the pitch change horns 52, as shown best in FIG. 4. Spherical bearings manufactured by HEIM, a division of Incom International, Inc., identified as UNIBAL Precision Series LHSSR, have been found in practice to operate successfully for this application. The pitch change arms 55 can thereby tilt with respect to the fixed top and bottom teeter bars 53 and 54 to tilt also the rotor blades 22 between a no-lift attitude to a lift attitude infinitely through approximately ten degrees (10°) of arc. This tilt is to the plane of the turning rotor blades. The pitch control horn mounting end 55B, as shown in FIGS. 3 and 4, includes mount 51 shown as a rectangular block secured thereto that is holed thereacross to accommodate bolt 48A fitted therebetween and through holes through link 48 ends. Mount 51 is thereby pivotally coupled between the ends of the pair of links 48, tilting the pitch change horns 52 with up and down movement of the links 48.

As set out above and as shown best in FIG. 4, vertical travel of the pitch change cross arm 41 is translated through the links 43, first and second compensator bearings 44 and 46, and links 48 and to the pitch change arm 55 to tilt the pitch change horn 52 and rotor blade ends 22C and 22D sandwiched thereto. Bolts 43A with washers 43B and nuts 43C fitted and turned on threaded ends thereof and bolts 48A with washers 48B and nuts 48C, are provided for pivotally connecting links 43 and 48 as described above. Preferably, the bolts 43A and 48A are fitted through oil bushings 84. Shown in FIG. 4, oil bushings 84 are aligned with links 43 and 48 with oil bushings 85 aligned with the first and second compensator bearings 44 and 46. Such arrangement of oil bushings is to provide minimum friction and generating pivotal couplings.

So arranged as shown in FIGS. 3 and 4, an increase in tension in the collective cable 39 moves the juxtapositioned first and second compensator bearings 44 and 46 against the biasing of coil spring 47 to pivot or tilt rotor blade root end 22A. This pivoting or tilting is identical for each rotor blade 22 and is from a no-lift to lift angle of attack of the individual rotor blade leading edges through a possible arc of approximately ten degrees (10°). When such tension on the collective cable 39 is relaxed, the coil springs 47 act against the respective compensator bearings to return the rotor blades to identical angles of attack as selected from the maximum to a minimum. In flight, the aerodynamic forces also act against the tension on collective cable 39.

Shown best in FIG. 4, the collective cable 39 must, of course, remain stationary while the pitch change cross arm 41, teeter bar assembly 23 with linkage therebetween, pre-rotator ring gear 75, and a magnetic pickup support ring 76, whose functioning will be set out hereinbelow, all pivot freely on rotor mast 19. The collective cable 39 end, shown as a shaft 62, that is keyed to slide in a longitudinal slot formed within a center longitudinal passage formed in a rotor retaining bolt 70 which shaft 62 further includes threaded end 63, is located above a collar 64. The threaded end 63 of such shaft 62 is shown holed laterally to receive a cotter key (not shown) fitted therethrough. To allow the pitch change cross arm 41 to turn freely with respect to the shaft 62, it is assembled between an upper tapered roller bearing 60 and bearing race 61 and a lower tapered roller bearing 65 and lower bearing race 66, with the cross arm retaining nut 40 turned over the threaded end 63 of that collective cable shaft 62. So arranged, the pitch change cross arm 40 is free to rotate with respect to the collective cable 39.

As shown best in FIG. 4, the collective cable shaft 62 is for telescoping through the center longitudinal opening in the rotor retaining bolt 70. So telescoped, the collar center 64 of that collective cable shaft 62 will seat on the head end of that rotor retaining bolt 70. The undersurface of the head end of such rotor retaining bolt 70 is, in turn, seated on a thrust bearing 72 that is positioned into the top end of spindle 21. So arranged, the spindle is free to rotate with respect to the stationary rotor retaining bolt 70.

Additionally, as part of the rotor system 20 as shown best in FIG. 4, below the spindle 21 is arranged the pre-rotator ring gear 75 that includes equidistantly spaced holes 75A formed therethrough, spaced equidistantly around a center opening. An inside spacer 78 is shown aligned to fit within a center opening of a magnetic pickup support ring 76 that is aligned below the pre-rotator ring gear center opening. The inside spacer 78 is to fit against the undersurface of the pre-rotator ring gear 75 within the magnetic pickup support ring 76. The magnetic pickup support ring 76 is shown to include bolts 77 that are fitted in notches formed at spaced intervals around the inside wall of the center opening therethrough which center opening receives the inside spacer 78 fitted therein to maintain the bolts 77 in a vertical attitude. Bolts 77 are thereby maintained in alignment with and to fit through holes 75A in the pre-rotator ring gear 75 to be turned into threaded holes formed at intervals in the undersurface of spindle 21, (not shown). When assembled, the spindle 21, pre-rotator ring gear 75, inside spacer 78, and magnetic support ring 76 are maintained together to rotate as a unit. The rotor retaining bolt 70 is, of course, fitted through this assembly, a threaded end 80 thereof to pass through a center hole 79A formed in a rotor retaining bolt base plate 79. The rotor retaining bolt threaded end 80 receives a rotor retaining nut 81 turned thereover, which rotor retaining bolt threaded end 80 will receive a pin 82, or the like, fitted laterally through a notch 81A in that rotor retaining nut 81 and is passed through a lateral hole 83 formed through the rotor retaining bolt threaded end 80. To provide for or allow the spindle 21 secured to the pre-rotator ring gear 75, cheek plates 56 and teeter bar assembly 23 to pivot or rotate freely with respect to the rotor retaining base plate 79, a tapered roller bearing 74 is seated to remain stationary on that rotor retaining base plate 79 with the rotor retaining bolt 70 fitted therethrough. A bearing race 73 is supported on that tapered roller bearing 74 and supports the turning inside spacer 78 and magnetic pickup support ring 76. A motor 74A may rotate a gear 74B to engage the ring gear 75. The motor 74A may be a DC motor powered from the battery of the autogyro 10.

Shown best in FIG. 4, parallel cheek plates 56 are teeter mounted to the spindle 21 by teeter bolts 45 that also support the first and second pitch compensator bearings 44 and 46 and telescope through the coil springs 47. The teeter bolt 45 threaded end is fitted through holes 21A on spindle 21 and receive nuts 86 turned thereover. So arranged, a teetering of tilting mount of each cheek plate 56 to the spindle is provided. A single pivot coupling of the parallel cheek plates 56 to the spindle 21 is thereby provided allowing the cheek plates 56 and connected teeter bar assembly 23 to pitch or teeter up and down to compensate for non-symmetry of lift where the more forward advancing rotor blade will want to climb with the retreating blade tending to go down around a full circle of rotation.

The individual top and bottom teeter bars 53 and 54 are shown in FIG. 4 arranged to extend parallel from opposite sides of the spindle by fitting bolts 56B through aligned holes 56A in the cheek plates near their ends with washers 56C fitted thereover and nuts 56D turned thereon, which bolts 56B also fit through holes 53A and 54A formed through the ends of the top and bottom teeter bars 53 and 54. Thereby, the teeter bar assembly 23 is mounted to cheek plates 56 that are pivotally connected to the spindle 21 to turn therewith and with the pre-rotator ring gear 75 and magnetic pickup support ring 76. The magnetic pickup support ring functions as a pickup for providing a rate of turning readout to a tachometer that is preferably displayed on the control panel 36 of FIG. 2 and is accordingly optional with the present invention.

Shown best in FIG. 4, as set out hereinabove, the combination of the spindle 21 mounted to the pre-rotator ring gear 75 and magnetic pickup support ring 76 along with the pitch change cross arm 41, cheek plates 56 and teeter bar assembly 23 are arranged to rotate freely together between bearings. Thereby, a pilot moving collective cable 39 at collective arm 30 can move the pitch change cross arm 41 and, in turn, pitch change horns 52 of the teeter bar assembly 23 to change the rotor blade angle of attack from no-lift through approximately ten degrees (10°) of arc to a maximum lift attitude.

The turning rotor system 20 is journaled on the rotor retaining bolt base plate 79 by the tapered roller bearing 74 seated on this rotor retaining bolt base plate that turns in bearing race 73 that is maintained to spacer 78. These components are held together in a stack by the rotor retaining bolt 70 that includes the center longitudinal cavity or hole wherethrough the collective cable 39 is fitted. The rotor retaining bolt head 71 supports, at a collar 64 of the collective cable shaft end 62, the lower tapered roller bearing 65 whereon the lower bearing race 66 is positioned supporting the pitch change cross arm 41 under surface with its upper surface supported by upper bearing race 61 wherein is seated upper tapered roller bearing 60 that contacts the undersurface of retaining nut 40 turned onto the threaded end 63 of the collective cable end 62. Completing the rotor assembly 20 component stack, the rotor retaining bolt threaded end 80 is fitted through hole 79A in the rotor retaining bolt plate 79 with rotor retaining nut 81 turned thereover. The rotor system 20 is thereby free to turn relative to rotor retaining bolt plate 79.

The rotor retaining bolt plate 79, shown as a flat block in FIG. 4, includes lateral holes 79B formed therethrough between parallel sides that are for aligning with the appropriate spaced 86A holes formed in a pair of cyclic arms 86. The cyclic arms include holes 86A that, when aligned with the rotor retaining bolt plate lateral holes 79B, receive bolts 87 fitted therethrough that receive nuts 87A turned over threaded ends thereof. The pair of cyclic arms 86 are thereby secured to the rotor retaining bolt plate 79. The cyclic arms 86 are thereby essentially parallel with each having a forward toe end that includes a hole 86B formed therethrough. The holes 86B are to align with one another and with a lateral hole 88A that is formed through a top bar end of cyclic-T 88. The cyclic arms 86 are mounted to the cyclic-T 88 by fitting a bolt 89 through an oil bushing 89A that is positioned to fit into the lateral hole 88A formed through the horizontal bar portion of that cyclic-T 88. The bolt 89 is to extend through and between cyclic arm toe openings 86B of the cyclic arms 86 and receive a nut 89A turned thereover. A vertically tiltable or pivotal coupling of the cyclic-T 88 to the rotor retaining bolt plate 79 is thereby provided. Further, the cyclic-T 88 includes a hole 88B formed through the vertical "I" portion of the "T" that is to receive an oil bushing and bolt or like connector, not shown, fitted therethrough and is secured to a block, not shown, that is mounted to the mast 19 head end between mast cheek plates 35, as shown in FIG. 2. So arranged, the cyclic-T 88 can be tilted or pivoted around the bolt or connector, not shown, fitted through hole 88B in the cyclic-T, across the vertical axis of the head end of mast 19. Thereby, roll control of the aircraft is provided with the pivotal mounting of the rotor retaining bolt base plate 79 to that cyclic-T that allows it to tilt or pivot up and down to a horizontal plane across the head end of mast 19, providing aircraft pitch control. Control of rotor system 20 tilting around the aircraft pitch and roll axis is provided by attachment of the ends of push/pull rods 90 preferably utilizing rod and bearings to the rearmost ends of the cyclic arms 86.

Shown in FIG. 4, this connection is provided by fitting bolts 90A through eyelet portions of rod end bearings, shown disassembled, having threaded opposite ends that are turned into the push/pull rods 90 and through holes 86C that are formed in the end of cyclic arms 86, opposite to the forward toe ends thereof. A linkage, not shown, is provided for connecting the control stick 25, shown in FIG. 2, to appropriately move the push/pull rods 90, the pilot, through that control stick thereby tilting appropriately the rotor system 20 so as to control the aircraft around its pitch and roll axis.

As set out above, the single rotor retaining bolt 70 with nut 81 turned thereover maintains the rotor system 20 to the rotor retaining bolt base plate 79. A failure of this bolt would be catastrophic, as the forces on the rotor system would immediately shear the collector cable 39, separating the rotor system from the mast 19. Accordingly, this bolt is designed not to break even under the abnormally high loads that are well in excess of anticipated loads. In practice, a one (1) inch diameter bolt formed of hardened steel that has a five-eighths (5/8) inch diameter hole drilled longitudinally has been used successfully in practice. The cyclic-T 88, like the rotor retaining bolt 70, the bolt 89 and the bolt or connector, not shown, that maintain the cyclic-T "I" portion to the mast head are also critical to operation of the aircraft. Accordingly, these bolts or connectors must be selected to have a load strength that is significantly greater than their anticipated loads.

As set out above, it is the tension that is applied to the collective cable 39, as opposed by the aerodynamic forces and coil springs 46, that provides a pilot with control of the angle of attack of the rotor blade 22 leading edges. This angle of attack is between a relaxed position where the coil springs 47 or aerodynamic forces will have urged the pitch change cross arm 41 to its most elevated position relative to the spindle 21 top. In this attitude, each rotor blade 22 angle of attack will be essentially at a no-lift configuration. By then moving the pitch change cross arm 41 towards the top of spindle 21, each rotor blade 22 angle of attack is changed to a lift configuration. As set out above, the maximum cross arm travel of the rotor blades will tilt the rotor blade leading edges approximately ten degrees (10°) of arc to the plane of the turning rotor blades. Accordingly, the tension applied to collective cable 39 directly controls the positioning of the rotor blade leading edges.

Figure 5A:
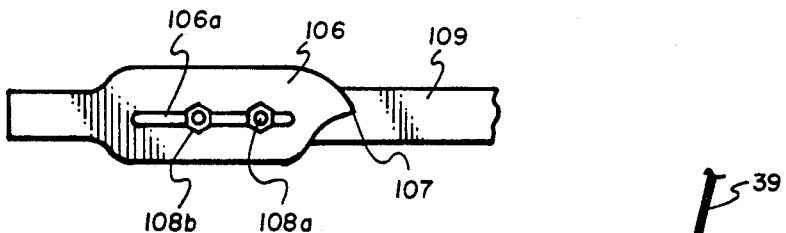
FIG. 5A shows a rear plan view of a section of the pitch control or collective arm of FIG. 5.
Figure 5:
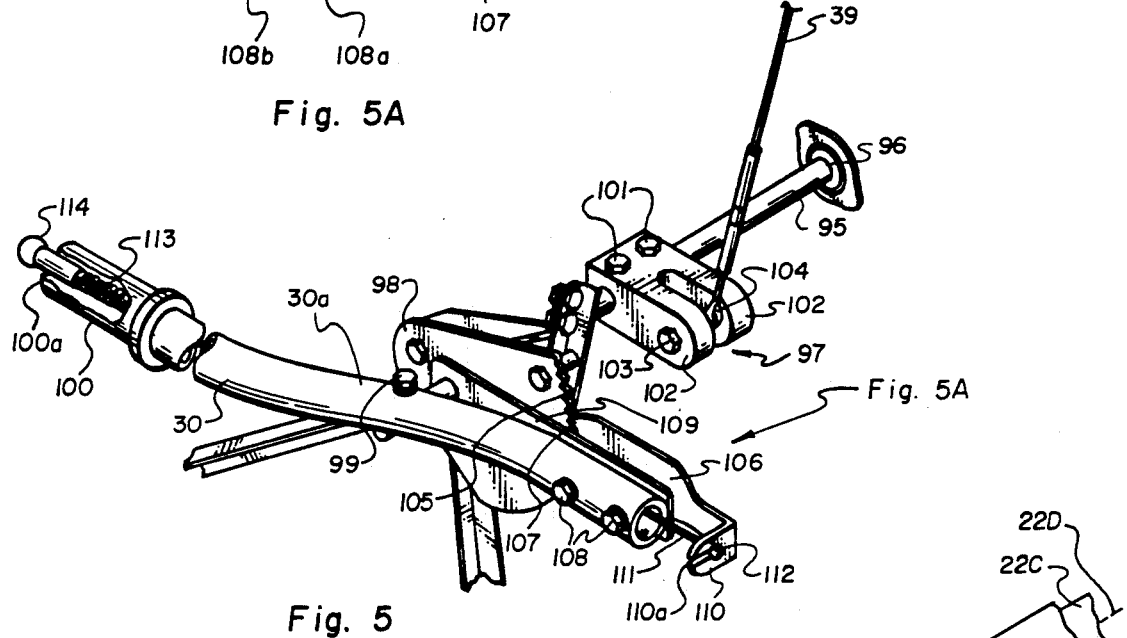
FIG. 5 is an enlarged profile perspective view of a pitch control or collective arm shown in FIG. 2 that is linked by the collective cable to the rotor blade pitch angle control mechanism of the rotor assembly of FIGS. 3 and 4.

Shown in FIGS. 2, 5 and 5A, the collective arm 30 is for controlling the collective cable 39 tensioning including setting, adjusting and locking it in place. Collective arm 30 includes an axle 95 that is pivotally mounted across the aircraft frame. One end of the axle 95 is shown journaled in a bearing 96 which may be a ball bearing or the like and is mounted to the aircraft frame. As shown best in FIG. 5, the axle 95 connects through a yoke 97 that is secured thereto by bolts 101. The axle 95 is journaled to turn freely through a hole that is formed through an arcuate gear segment 98 that is shown fixed to the aircraft frame. The arcuate gear segment 98 includes equidistantly spaced teeth 105 formed along a forward arcuate edge thereof. From the arcuate gear segment, the axle 95 is connected at its end by a bolt 99 to a mid portion of collective arm 30. So arranged, pivotal travel of the collective arm 30 responsive to a pilot gripping and lifting a handle end 100 thereof pivots the axle 95 that, in turn, pivots the yoke 97. Yoke 97 includes upward projecting parallel sides or arms 102 that extend from a center web. The yoke arms 102, in turn, each including holes formed therethrough that are aligned to receive a bolt 103 or the like fastener fitted therethrough, may include a bushing. The bolt 103 is to fit through an eyelet end 104 of the collective cable 39. So arranged, the collective cable 39 is secured to and will be moved with the pivoting of the yoke 97 which movement is dependant upon the collective arm 30 positioning and increases or decreases the tension applied to collective cable 39. The bolt 99, bolts 101, bolt 103 and yoke 97 thus serve as a tension connection means between collective cable 39 and the pitch control arm 30.

It is desirable for a pilot to be able to set and maintain the collective arm 30 positioning for a desired rotor blade angle of attack during flight. The present invention, as shown in FIGS. 5 and 5A, provides for setting and maintaining that collective arm 30 positioning by an arrangement of a slide 106 that includes a single tooth or point 107 formed along one end thereof. The slide point or tooth 107 faces in opposition to engage the teeth 105 of arcuate gear segment 98. The arcuate gear segment 98 is, of course, fixed to the aircraft frame and so is stationary relative to collective arm 30. The slide 106, as shown best in FIG. 5A, includes a longitudinal slot 106A formed therein to receive bolts 108 fitted therethrough. Nuts 108B are turned over bolt threaded ends 108A to provide a sliding mount to slide 106 with respect to a bar 109. Bar 109 receives bolts 108 fitted therethrough securing its one end to the collective arm 30 with axle 95 journaled through its other end. So arranged, the slide 106 can move longitudinally along bar 109. The point 107 of slide 106 is to engage with and disengage from the teeth 105 that are formed on the arcuate gear segment 98 arcuate end. So arranged, with the slide point 107 engaging the arcuate gear segment teeth 105, a rigid coupling of the collective arm 30 to the aircraft frame is provided, maintaining the positioning of the yoke 97 and collective cable 39 secured thereto. Release of the slide 106 so as to move the point 107 thereof out of engagement with the arcuate gear segment teeth 105 releases the collective arm allowing the pilot to move it appropriately to alter the tension applied to collective cable 39.

Shown in FIG. 5 to provide for release and locking of the collective arm 30, a flexible rod 111 that is shown within a broken away portion of handle 100 in FIG. 5, extends the length of the collective arm with its opposite end formed into a saddle 112. A button 114 is formed of the flexible rod 111 that extends outwardly from the end 100A of handle 100. The button 114 is preferably outwardly spring biased by a coil spring 113 that is shown through the broken away portion of handle 100 as supported at its ends between the button bottom end and a bend 30A formed in the collective arm 30. So arranged, the coil spring 113 urges the button 114 outwardly from the handle 100 end 100A which button 114 connects to extend from the end of flexible rod 111. The flexible rod 111 includes the saddle end 112 that is arranged to move a right angle foot end 110 of slide 106 therewith. Travel of slide 106, as set out above, moves the slide point 107 into or out of engagement with the teeth 105 of the arcuate gear segment, locking or unlocking the collective arm 30 positioning. Depressing button 114 against the biasing of coil spring 113 moves the saddle 112 whose narrow center portion is slid along a slot 110A in right angle foot end 110 displacing the right angle foot end 110 therewith and moving the slide point 107 out of engagement with the arcuate segment teeth 105 allowing the pilot to reposition the collection arm 30 so as to change the tension on collective cable 39. Whereafter, by releasing button 114, the biasing of spring 113 returns the slide 106 point 107 into engagement with arcuate gear segment teeth 105 locking the control arm 30 in place. It should, of course, be understood that the wire rod 111 needs to be both flexible enough to be fitted longitudinally through the collective arm 30 and yet rigid enough so as to provide, when the button 114 is depressed, for urging the slide point 107 of slide 106 out of engagement with the teeth 105 of the arcuate gear segment 98. As shown in FIG. 5A, the slide 106 travel is limited between the bolts 108 fitted through slide track 106A. Thereby, at one slide limit of travel, the slide point 107 will mesh with the teeth 105 of arcuate gear segment with, at the other travel limit, the teeth 105 and point 107 will be out of engagement. Bar 109, that is included between the collective arm 30 and slide 106 along with the arcuate gear segment, receives the axle 95 journaled therethrough and may include a bearing wherethrough the axle 95 is fitted.

It should be understood that the teeter ba assemblies 23A and 23B are pivotally mounted to rotor system spindle 21 to allow the rotors 22A and 22B to teeter or tilt 22C about their axis 22D with respect to the spindle 21. Each spinning rotor blade 22A and 22B is an air foil or wing which rotates counterclockwise 19A about axis 19B. Each blade 22A and 22B climbs in the forward direction 18A so that a different angle of attack between the blade and the relative wing 18B is required in the forward direction and the rear direction. The forward advancing rotor blade 22A or 22B will tend to teeter or tilt upward (FIG. 2) during the forward part of its movement and to tilt downward as it passes from the forward pointing attitude as shown in FIG. 2 and moves rearward 18C to a rearward pointing attitude (FIG. 2). So arranged, the teeter bar assembly 23A and 23B accommodates the dissymmetries of lift of the leading edges of the turning rotor blades 22A and 22B.

Figures 6A, 6B:
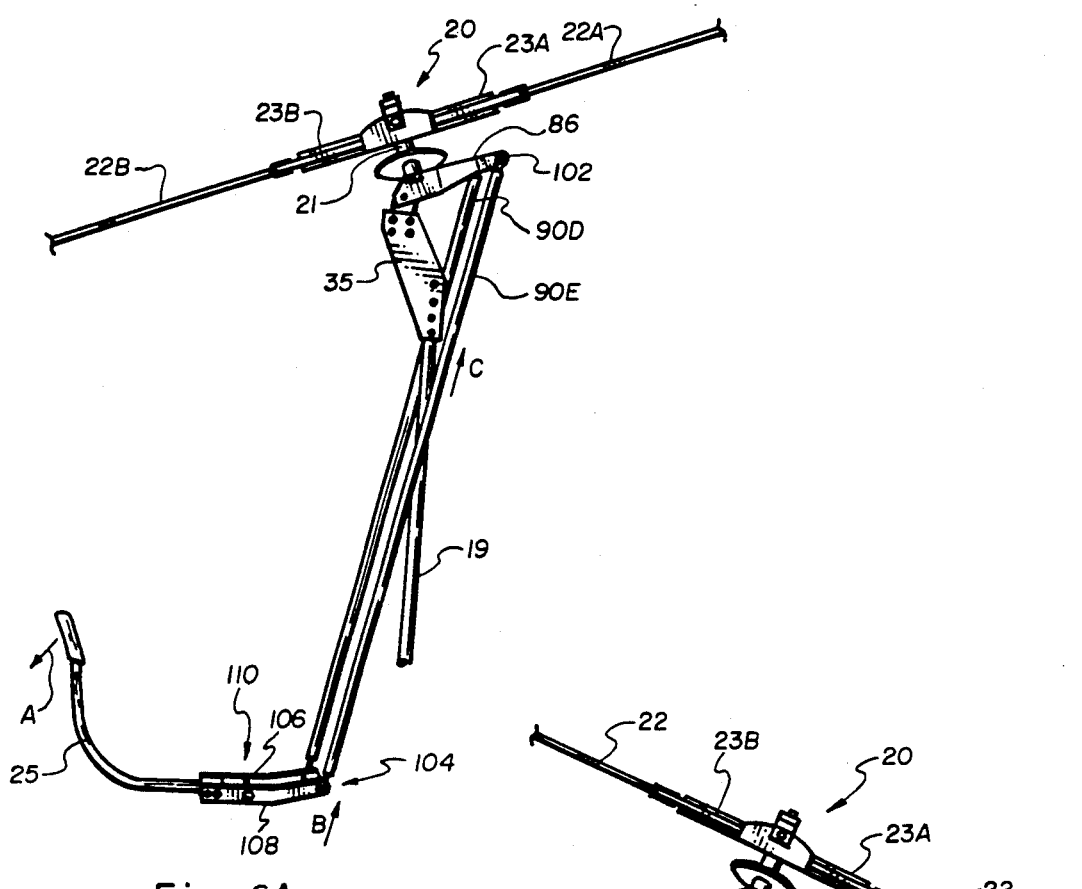
FIGS. 6A and 6B depict the stick and altitude control system of the aircraft of the invention.
Figure 7:
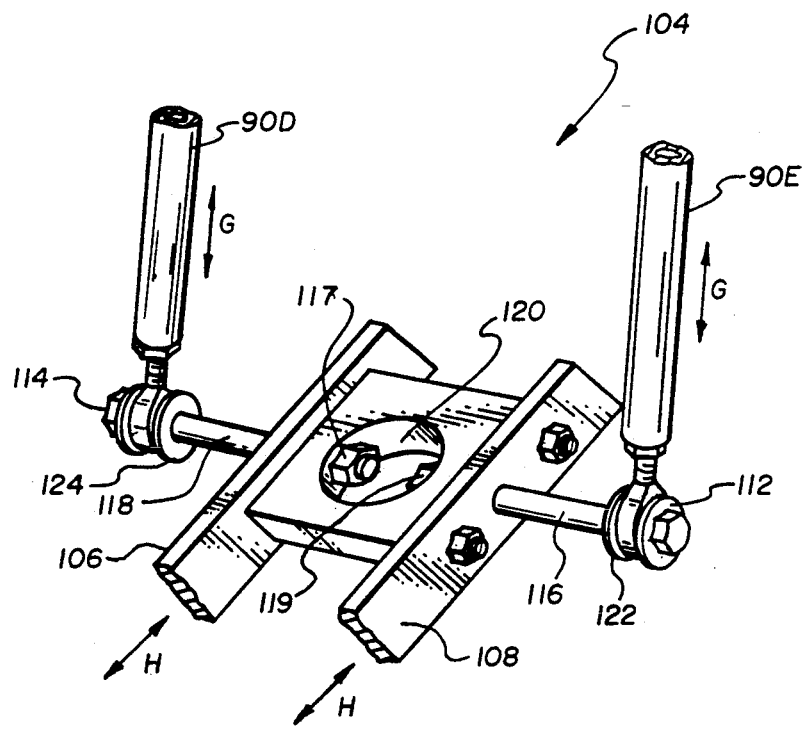

The push/pull rods 90D and 90E, as shown best in FIGS. 6A and 6B, extend between from cyclic arms 86 to be pivotally connected by pin 102 to a cyclic mount 104, as shown best in FIG. 7. Shown in FIG. 8, the cyclic mount 104, in turn, connects through parallel cyclic arm bars 106 and 108 to a cyclic arm brace 110 that, in turn, connects to joystick 25.

FIG. 6A shows the joystick 25 being moved forward illustrated by arrow A. This movement pivots the respective cyclic arm bars 106 and 108 in an upward arc as indicated by arrow B. In turn, the push/pull rods 90E and 90D are urged upwardly in the direction of arrow C. Accordingly, the rotor system 20 plane of rotation (normal to axis 25C) is rotated about axis 25A to place the aircraft in a descending attitude, as depicted in FIG. 3A.

With the joystick 25 pulled rearwardly, as illustrated by arrow D in FIG. 3B, the cyclic arm bars 106 and 108 are moved in a forward and downward arc, as illustrated by arrow E, pulling the push/pull rods 90D and 90E downwardly, as illustrated by arrow F. The rotor system 20 plane of rotation is thus tilted upwardly to where the aircraft is in an ascending attitude as depicted in FIG. 3B. Accordingly, by pulling or pushing on the joystick 25, the aircraft may be moved around its pitch axis 25A.

Aircraft control about roll axis 25B is provided by moving that joystick 25 from left to right or right to left across the pilot's front elevating one push/pull rod 90D while lowering the other 90E to tilt the cyclic arms 86 and the connected rotor retaining plate from side to side with respect of the head end of mast 19. So arranged, a pilot moving joystick 25 controls the aircraft around its pitch 25A and roll 25B axes.

While a pilot operating joystick 25 has been shown and described herein, it should be understood that autogyro 10 could be adapted to be flown remotely. In such configuration, servo motors or the like arranged to perform the described movement of joystick 25, could be utilized within the scope of this disclosure.

Illustrated in FIG. 7, the push/pull rods 90D and 90E are shown pivotally connected by nuts 112 and 114 to the ends of rod axles 116 and 118. The rod axles 116 and 118 extend outwardly and oppositely from sides of a plate 120 of cyclic mount 104 and are held in place by nuts 117 and 119. The plate 120 is shown secured between the parallel cyclic arm bars 106 and 108 preferably cut from metal plate stock of sufficient strength to meet Federal Aviation Administration standards for aircraft controls. The rod axles 116 and 118 are bolts having head ends arranged with locking rings 122 and 124 to maintain push/pull rod pivotal 90D and 90E at the outer ends. The push/pull rods 90D and 90E can therefore move upwardly or downwardly (arrow G) responsive to the downward or side to side tilting of the cyclic arm bars 106 and 108 about arm brace 110 as illustrated by arrows H.

Figure 8:
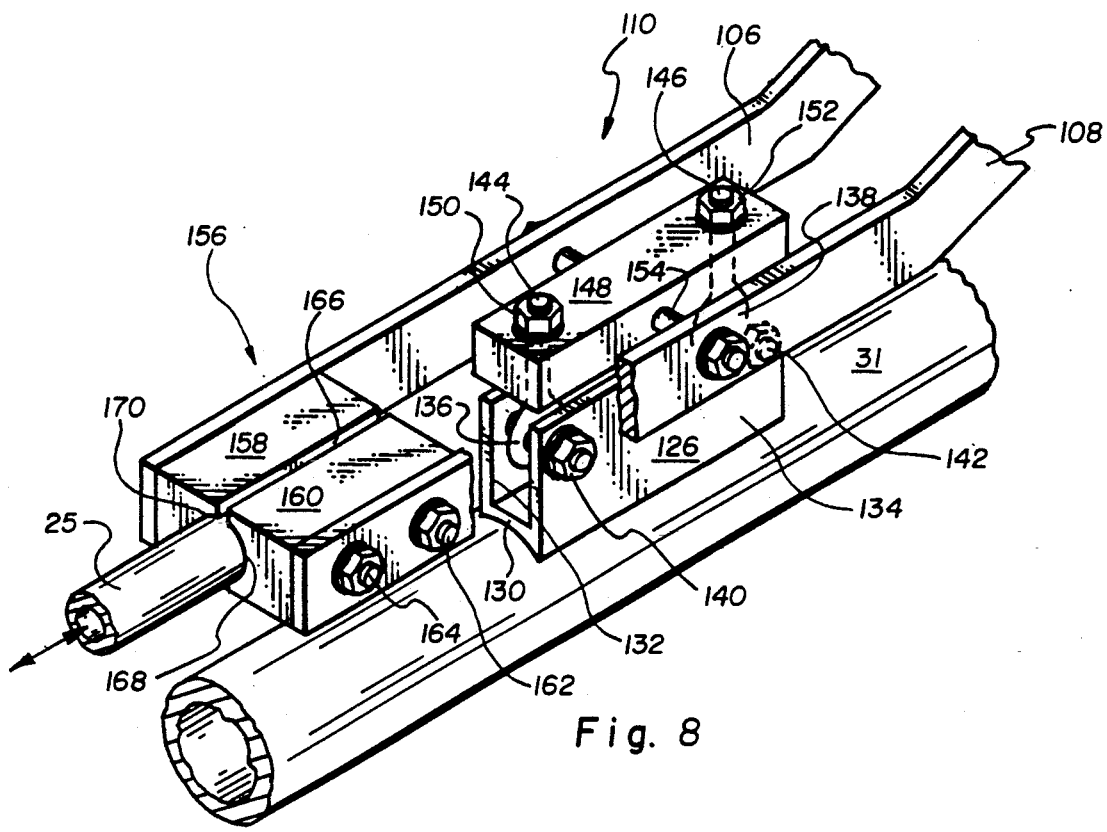
FIGS. 7 and 8 are perspective views of portions of the control system of FIGS. 6A and 6B.

FIG. 8 shows a section of the frame or keel tube 31 with a bracket 126 secured thereto as by welding, bolting or the like. Which bracket 126 includes a base 130 and equal upright parallel sides 132 and 134. A section of cyclic arms 108 is shown broken away to expose rod end bearings 136 and 138 installed between the sides 132 and 134 of bracket 126. The rod end bearings 136 and 138 are preferably spherical bearings with a shaft extending therefrom. Pairs of aligned holes are formed in the side 132 and 134 to align with a hole formed through the spherical bearing end of each rod end bearings 136 and 138 and receive a bolt and nut combination 140 and 142 fitted therethrough. The rod end bearings 136 and 138 are thereby secured or supported in the bracket 126. Each rod end bearing 136 and 138 has a threaded end 144 and 146 which is fitted through spaced apart, longitudinally centered holes that are formed through a universal bar 148 and secured thereto by nuts 150 and 152. The universal bar 148 is thereby coupled by the pair of rod end bearings 136 and 138 such that it can travel from side to side in an arc across the open top end of bracket 126. The universal bar 148, in turn, is pivotally coupled by a single center pivot 154 between the cyclic arm bars 106 and 108, which pivotal coupling preferably includes a bearing not shown.

The cyclic arm bars 106 and 108 are free to pivot vertically up and down around the center pivot 154 with universal bar 148 and to tilt from side to side with the universal bar 148 across the bracket 126.

The cyclic bars 106 and 108 terminate in a clamp 156 on their ends opposite to the cyclic mount 38. The clamp 156 is formed as two opposing sections 158 and 160 that are urged together by nut and bolt combinations 162 and 164. The opposing surfaces 166 and 168 are each longitudinally arcuately slotted forming, when fitted together, a cylindrical hole 170 to accommodate the cylindrical end of the joystick 25 clamped therebetween. Movement of the joystick 25 is therefor transmitted to the arm bars 106 and 108 and, in turn, to the push/pull rods 90D and 90E.

In flight, a pilot may set the joystick 25 to a position to maintain a desired flight attitude. To lessen the strain on such pilot to maintain the desired joystick position, it is convenient and desirable to be able to trim the pitch and roll controls to ease the physical effort involved. A trim system to apply a force on the individual push/pull rods 90D and 90E is included to oppose the dynamic forces exerted on the aircraft controls in flight. To operate the preferred trim assembly of the present invention, the pilot establishes a desired flight attitude and then operates the trim assembly until he feels flight pressures on the joystick 25 relieved.

Figure 9:
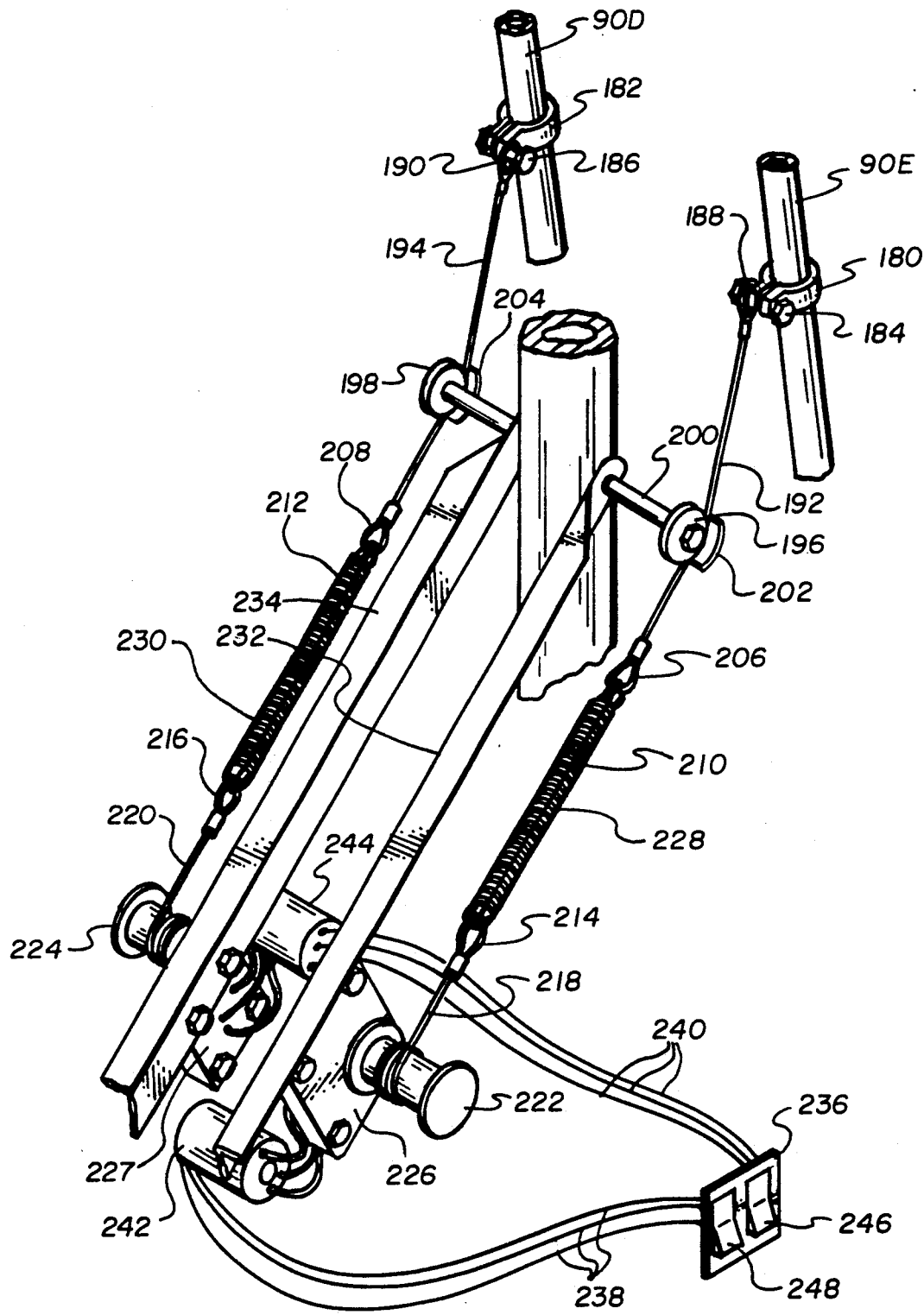
FIG. 9 depicts a trim system for use with the aircraft of the present invention.

The present invention provides a trim assembly that will apply force on each of the push/pull rods 90D and 90E. FIG. 9 shows the individual push/pull rods 90D and 90E with clamp-type collars 180 and 182 secured therearound by a bolt and nut combination 184 and 186. The bolt and nut combinations 184 and 186 are also fitted through loop ends 188 and 190 of cables 192 and 194. First trim cables 192 and 194 are passed over trim cable pulleys 196 and 198 that, in turn, are each journaled to opposite ends of an axle 200. Axle 200 is shown extending through apertures formed in the mast 19 to extend at right angles therefrom. While not shown, pulleys 196 and 198 preferably include bearings for limiting resistance to their turning freely on axle 200. Additionally, trim cable retaining guards 202 and 204 are preferably secured to the axle 200 adjacent to and to partially cover each circumferential pulley 196 and 198 to maintain the respective trim cable 192 and 194 trained thereover.

The first trim cables 192 and 194 extend from each pulley 196 and 198 to terminate in loop ends 206 and 208 which are, in turn, connected to one end of trim springs 210 and 212. Each trim spring 210 and 212 are preferably coil springs connected on their other ends to loop ends 214 and 216 to second trim cable 218 and 220. Each trim cable is thus formed of the first trim cable 192 and 194 and the second trim cable 218 and 220 with springs 210 and 212 thereinbetween so that the entire cable may stretch under tension so the pilot may make aircraft attitude changes by moving the joystick 25 notwithstanding the trim system status. The trim springs 210 and 212 are sized so that the pilot may overcome them and, in turn, the trim. Thus, an attitude correction may be made without a requirement to reposition the trim before, during or after movement of the joystick 25.

The second trim cables 218 and 220 are wound around spindles 222 and 224 which extend axially from trim motors 226 and 227.

The trim motors 226 and 227 are secured to angle braces 232 and 234 as shown in FIG. 9. The braces 232 and 234 are connected at one end to axle 200 and at their other ends to the aircraft frame not shown. The angle braces 232 and 234 anchor the motors 226 and 227 to the frame, and the motors 226 and 227 are secured to the braces 232 and 234 by bolts or clamps not shown. Operation of the trim motors 226 and 227 reels the second trim cables 218 and 220 onto or off of the spindles 222 and 224. The second trim cables 218 and 220 therefor pull a connected push/pull rod 90D and 90E downwardly, and when reeled out, release tension on its respective push/pull rod 90D and 90E that is thereafter lifted by the action of the turning rotor system. Individual trim motors 226 and 227 operation is preferably controlled through a pair of switches 236 linked to the aircraft storage battery, not shown, by two sets of three wires 238 and 240 that connect through transformers 242 and 244 to the individual trim motors 226 and 227.

Each of the switches 246 and 248 of the pair of switches 236 is a two-position switch and is connected to its respective trim motor 226 and 227 to turn the motor in either direction. The individual trim motor 226 and 227 thereby turn each spindle 222 and 224 to reel in or reel out the second trim cable 218 and 220. In practice, an electric motor known as a Model K Gear Motor manufactured by Brevel Products has been used successfully for this application. Each of the pair of switches 236 is preferably a double throw switch and is spring biased to a center neutral or off position. A conventional electrical switch known as 1472VAC, Momentary Rocker Switch, manufactured by Aircolectric Company has been found in practice to be suitable for the described use. The depression of a switch 246 or 248 to one side will accordingly pass current to turn a trim motor 226 and 227 in one direction. The switch 246 or 248 depressed to the other side turns the trim motor oppositely.

Each trim spring 210 and 212 preferably further includes safety tethers or cables 228 and 230 that are sized to be longer than the springs 210 and 212 when fully extended and here shown positioned within and through the spring 210 and 212. The tethers 228 and 230 are connected at their opposite ends to first trim cables 192 and 194 and second trim cables 218 and 220. The safety tethers or cables 228 and 230 maintain the integrity of trim cable should the trim springs 210 and 212 break. They also serve to limit or inhibit inelastic deformation.

Figure 10:
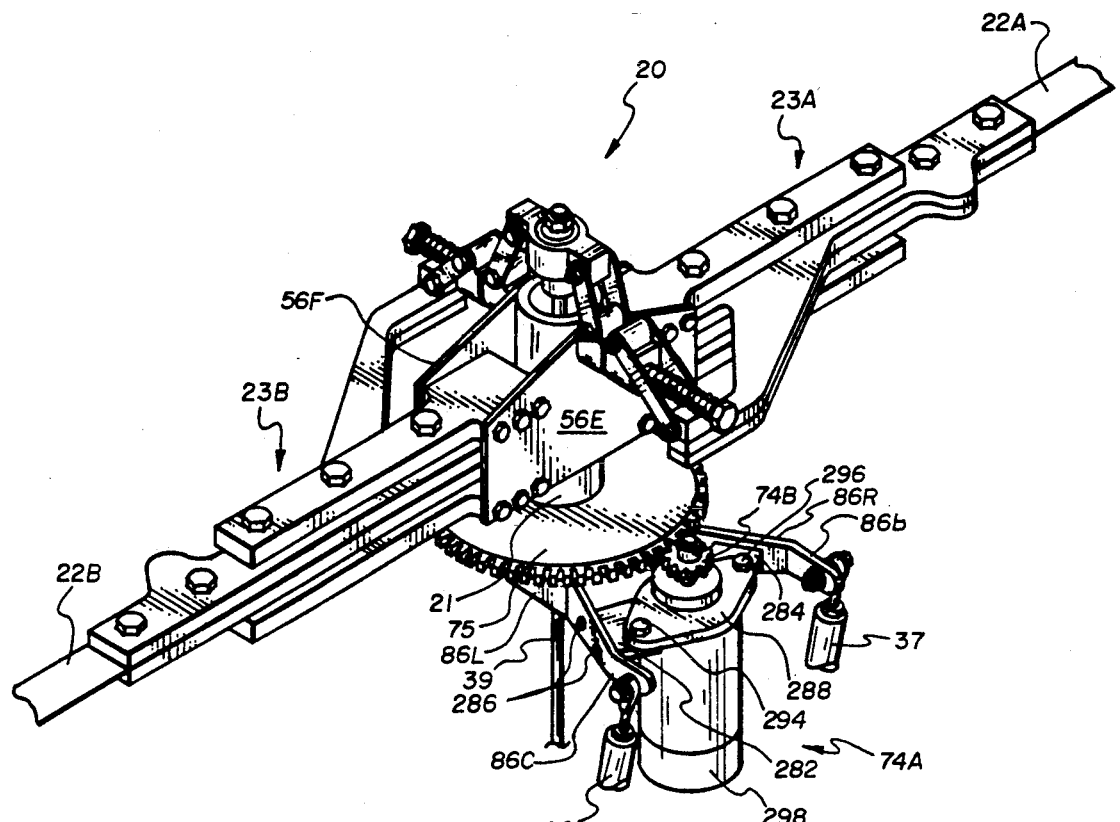
FIG. 10 is a partial perspective view of portions of the rotor arrangement of the invention.

FIG. 10 shows a pre-rotation system for turning the rotor system 20 to or above a takeoff rate or speed of rotation so that the relative wind up through the rotor blades 22A and 22B will generate sufficient lift to support the aircraft in flight. With the rotor system 20 rotating at a takeoff rate of rotation, the aircraft can lift off with only a short takeoff roll during which the rotor blades 22A and 22B angle of attack is changed from a no-lift to lift attitude. Further, with the rotor blades 22A and 22B rotating above takeoff rate, they may be pivoted to a full lift attitude so the aircraft can perform a rapid takeoff. The pre-rotation system of the present invention provides for turning the rotor system 20 to such a rotation rate.

Shown in FIG. 2, the autogyro 10 includes a control panel 36 whereon are arranged gauges, switches and the like that afford a visual indication of aircraft and engine functioning. One such switch may energize the pre-rotation system of the present invention. A trigger or button switch that extends outwardly from the end of the joystick 25 is configured to activate the pre-rotation system of the present invention.

As shown in FIG. 10, the rotor system 20 includes a pre-rotation ring gear 75 fixed across the spindle 21 lower end. The pre-rotation ring gear 75 is preferably secured to the spindle 21 by bolts or like fasteners 77 (FIG. 4) above a bearing 74 that is arranged between it and a rotor retaining plate, not shown, whereto the cyclic arms 86 are fixed. So arranged, the pre-rotation ring gear 75 is free to rotate with respect to the rotor retaining plate 79 and cyclic arms 86L and 86R that, in turn, are pivotally mounted at ends 86C and 86D to the push/pull rods 37 and 90.

Figure 11:
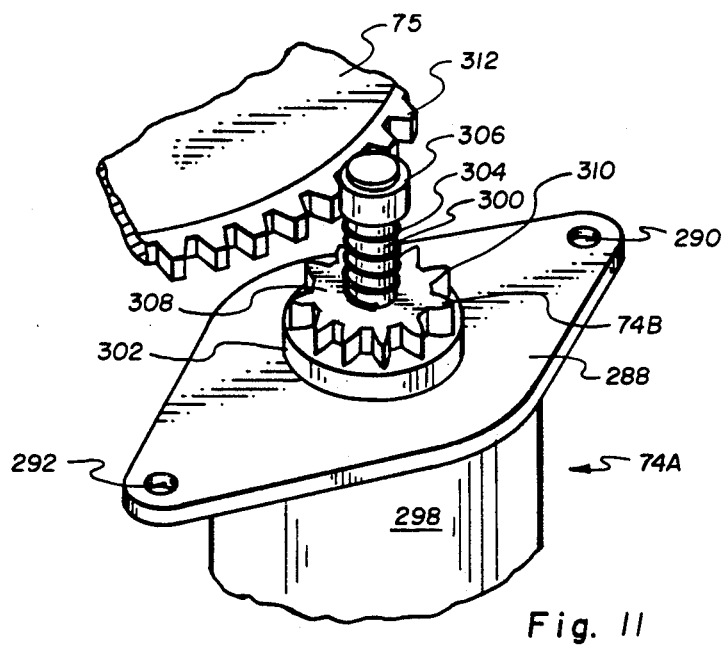
FIG. 11 is a partial perspective view of portions of the pre-rotation structure of the autogyro of the invention.

The cyclic arms 86L and 86R each include opposing flanges 282 and 284 that are mounted by bolts such as bolts 286 to extend inwardly from the cyclic arms 86L and 86R. The flanges 282 and 284 are appropriately configured at their free ends with a concave surface to accommodate and snugly fit against a side of a cylindrical pre-rotation motor 74A. The pre-rotation motor 74A is shown to include, across one end thereof, a flange mount 288. The flange mount 288 is shown as being diamond shaped with holes 290 and 292 formed therethrough proximate to the opposite apex ends, as shown best in FIG. 11. The holes 290 and 292 are sized to receive fasteners shown as bolts 294 and 296 in FIG. 10. The fasteners also fit into holes (not shown) formed in the flange mount 288.

The pre-rotation motor 74A includes a cylindrical housing 298 of a conventional direct current (DC) operated motor. Electrical power is preferably supplied to the pre-rotation motor 74A from the autogyro battery (not shown) preferably routed through a switch 260, as shown in FIG. 2.

The pre-rotation motor 74A cylindrical housing 298 contains a conventional armature turning between a field magnet and includes slip rings and brushes in a conventional arrangement. A shaft 300 extends outwardly from the housing 296 through a top or head end 302 of the motor housing 298 which extends through a center opening in the flange mount 288. The shaft 300 has a coil spring 304 wound therearound between a head end collar 306 on shaft 300 and a top surface 308 of a drive gear 74B splined onto shaft 300. So arranged, the spring 304 will urge the gear 74B downwardly away from the collar 306 in response to a bendix clutch, not shown, located within the housing 298.

When the clutch is energized, the gear 74B will travel along shaft 300 so that the teeth 310 will engage or mesh with teeth 312 of the pre-rotation ring gear 75. It should be understood that a conventional bendix arrangement of a vehicle starter motor will, in practice, be suitable as the pre-rotator motor 74A with engaging gear 74B. A motor manufactured by Bosch/United Technology, identified as SM02556 has been used successfully for this function.

For controlling the autogyro 10 around its yaw axis 25C, the present invention includes a rudder pedal with brake assembly 27. As shown best in FIG. 12, the rudder pedal with brake assembly 27 includes left rudder pedal with brake assembly 27 and includes left rudder pedal 27B and right rudder pedal 27A arranged side by side and in general alignment when the rudder 16 is in a neutral position oriented along the aircraft center longitudinal axis 25B. The rudder pedals 27A and 27B will move oppositely when one or the other is depressed by the pilot, as will be set out in greater detail hereinbelow. The left and right rudder pedals 27B and 27A, respectively, are preferably foot shaped plates each having a heel support 320 and 322 which extend outwardly at approximately a right angle from around the heel or bottom end of each rudder pedal 27B and 27A. The respective left and right rudder pedals 27B and 27A are mounted across the instep to pivot or rotate near the mid point 324 and 326 which is proximate of the foot of a user positioned on the pedals 27B and 27A.

Figure 12:
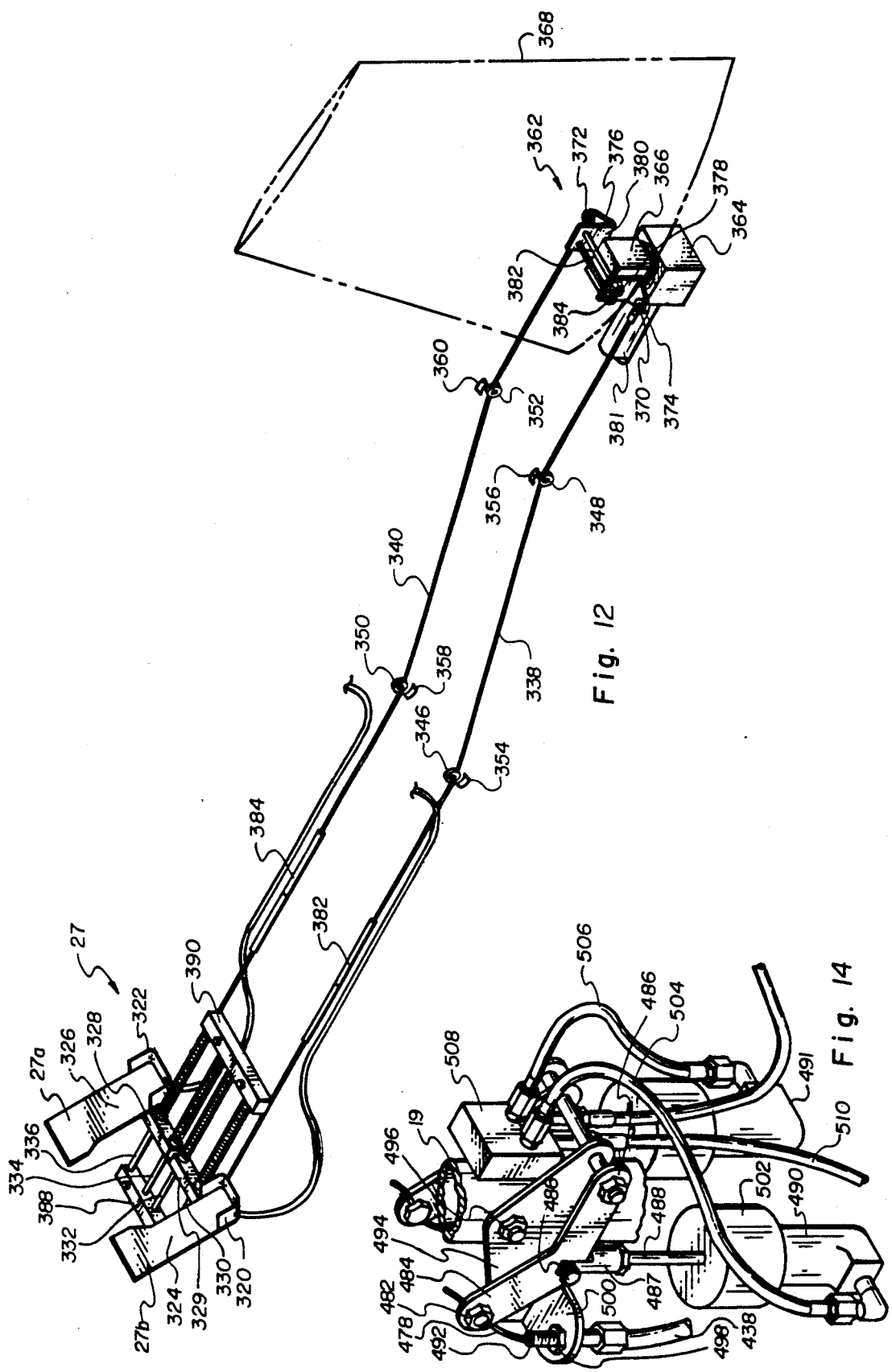
FIG. 12 is a partial perspective view of the rudder pedal assembly of the autogyro of the invention.
Figure 13:
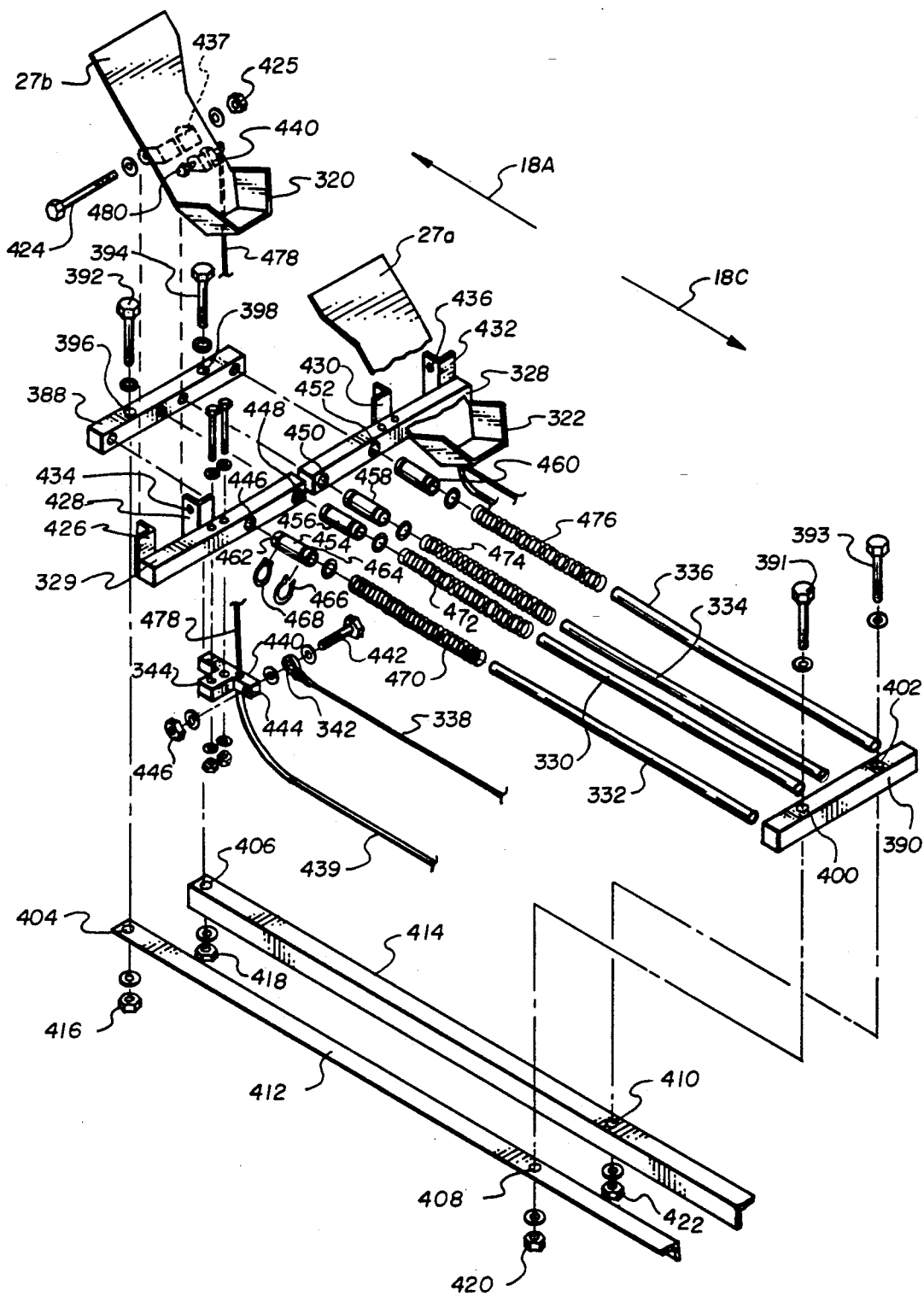
FIG. 13 is an exploded perspective view of the rudder pedal structure of the rudder pedal assembly of the autogyro of the invention.

Each pedal 27B and 27A is mounted to sliding pedal mounts 328 and 329, as shown in FIGS. 12 and 13. The pedal mounts 328 and 329 move back and forth longitudinally along slide bars 330, 332, 334 and 336 in response to movement of the feet of the pilot. The pedals 27B and 27A are synchronized so that movement of one rudder pedal away from the pilot will cause the other rudder pedal to move towards that pilot. For translating travel of the rudder pedals 27B and 27A to rudder 16, rudder cables 338 and 340 are shown connected at a loop end 342 thereof to a sheath tee 344. The sheath tee 344 is mounted to a left sliding pedal mount 329. A similar sheath tee is attached to the left sliding pedal mount 328 but is not shown for clarity. Accordingly, the description of the left rudder pedal 27B, pedal mount 328 and cable 338 is the same as the right side but for differences necessary to accommodate installation on the opposite side.

As shown in FIG. 2, the rudder cables 338 and 340 pass over cable guide rollers 346, 348, 350 and 352, as shown. The rudder cables 338 and 340 are maintained on the rollers by keepers 354, 356, 358 and 360, respectively. Each rudder cable 338 and 340 connects to one side of opposite parallel sides of a pivot mount 362. The mount 362 has a fixed base 364 and a rotating block 366 to which the rudder 16 is secured to extend upwardly therefrom. The rudder cables 338 and 340 are fastened to the block 366 so that are thereby effectively the rudder 16 is pivoted such that its rear edge 368 moves toward the side of the depressed rudder pedal 27B or 27A. The rudder cables 338 and 340 each include loop ends 370 and 372 that are mounted to outwardly projecting legs 374 and 376 of right angle flanges 378 and 380. The right angle flanges 378 and 380 have aligned parallel faces that receive bolt 382 and 384 nut combinations fitted therethrough sandwiching the rudder block 366 of the rudder 16 therebetween. The rudder block 366 is pivotally connected to fixed base 364 that is secured to keel tube 381 of the aircraft frame. The legs 374 and 376 of each right angle flange 378 and 380 are thereby coplanar and extending oppositely. Holes are formed in the ends of the flanges 378 and 380 and, more specifically, the legs 374 and 376 to receive a bolt or rivet to hold loop end 370 and 372 to the block 366.

Rudder cables 338 and 340 are shown in FIG. 12 to include buckles 384 and 386 which facilitate the lengthening or shortening of each cable 338 and 340 as necessary to adjust the travel of the pedals 27A and 27B. Referring to FIG. 4, the pedals 27A and 27B are secured to pedal mounts 328 and 229 which slide on the slide bars 330, 332, 334 and 336. The bars 330, 332, 334 and 336 are mounted between forward and rear end caps 388 and 390, respectively. The end caps 388 and 390 are secured to the aircraft frame by bolts 391, 392, 393 and 394 Which fit through spaced apart holes 396, 398, 400 and 402 formed in the end caps 388 and 390 and through holes 404, 406, 408 and 410 formed through right angle members 412 and 414 of the aircraft frame. Nuts 416, 418, 420 and 422 are threaded onto each bolt 391, 392, 393 and 394, as shown in FIG. 13.

The slide bar end caps 48 are thereby fixed to frame members 50 with slide bars 33 extending therebetween.

The sliding pedal mounts 328 and 329 are journaled to travel freely back and forth along slide bars 320, 322, 324 and 326. The rudder pedals 27B and 27A, in addition to being movable longitudinally, are each mounted to pivot about bolt 424 positioned through upright brackets 426 and 428 as well as 430 and 432. The bolt 424 is held in place by nut 425. Such brackets 426, 428, 430 and 432 are arranged in pairs with each pedal mount 328 and 329 having one pair. The bolt 424 is positioned through apertures such as apertures 434 and 436 formed in the brackets as well as pedal brackets 438. The pedals 27A and 27B are thus able to pivot or tilt around the bolt 424 which is positioned proximate the sole instep or mid portion of the user's foot when positioned on the pedal 27A and 27B. Brake cables 478 are each connected at an end to the undersurface of a pedal 27A and 27B by connectors 440. The brake cable 478 extends through lateral 440 formed in sheath tee 344. The rudder cable 338 is shown formed into a loop 342 to receive a bolt 442 fitted therethrough and through lateral hole 444 to receive nut 446 on its threaded end.

The slide bars 330, 332, 334 and 336 are fitted in cups or openings formed in the opposing surfaces or faces of the end caps 388 and 390. The slide bars 330, 332, 334 and 336 are aligned parallel and are rigidly mounted between the forward and end caps 338 and 390. The respective left and right slide pedal mounts 329 and 328 include holes 446, 448, 450 and 452 formed therethrough to receive linear bearings 454, 456, 458, 460 through which individual slide bars 330, 332, 334 and 336 are fitted. The linear bearings 454, 456, 458 and 460 support the respective slide pedal mounts 329 and 328 as they are moved back and forth along the slide bars 33. The respective linear bearings 454, 456, 458 and 460 each have circumferential grooves such as grooves 462 and 464 formed around their opposite ends to receive locking rings such as locking rings 466 and 468 to lock each linear bearing within its respective sliding pedal mount 328 and 329.

Coil springs 470, 472, 474 and 476 are shown telescoped over the slide bars 330, 332, 334 and 336 to fit between the sliding pedal mount 328 and 329 and the end cap 390. Movement of either the left or right rudder pedal 27B pr 27A moves its respective pedal mount 428 and 429 towards the front slide bar 388. The rudder cables 338 and 340 travel in relation to the movement to move the rudder 16. As one pedal 27B moves forwardly 18A, the other pedal 27A moves rearwardly 18C. Movement of the pedals 27A and 27B is opposed by the coil springs 470, 472, 474 and 476 that is compressed by the rearward travel of the undepressed rudder pedal and its sliding pedal mount 328 and 329. When the force moving the one sliding pedal mount forward is removed, those coil springs 470, 472, 474 and 476 act on the other undepressed sliding pedal mount to move it forward. The coil springs 470, 472, 474 and 476, therefore, urge the sliding pedal mounts 328 and 329 into an aligned neutral alignment. Of course, the air flow over rudder 16 in flight tends also to return it to a neutral attitude.

In FIG. 13, the center cable 478 is shown telescoped out from within cable sheath 439 and connected at its end by a bolt 480 to the bracket 440.

A brake cable 478 which has been found satisfactory is part 610-03140. The sheath 439 is identified as part 610-03330 manufactured by Flanders Company, Pasadena, Calif. The center cable 478 is coupled by a bolt 482 to one end of a crank 484, as shown in FIG. 14. Crank 484 movement around a pivot bolt 486 moves the bolt 486 and connector 487 to move piston 488 into a brake cylinder 490 to force fluid under pressure to individual aircraft wheel 13 brakes.

The sheath 439 of the brake cable is secured by a connector 492 to provide for relative movement between the cable 478 and sheath 439. The cylinders 490 and 491 are held by a mounting bracket 494 which is coupled to the aircraft vertical mast 19 by a nut and bolt combination 496. The connector 492 is held by a lock nut 498. The connector 492 is positioned through a hole formed through a right angle arm 500 of mounting bracket 494.

The brake cylinder piston rod 488 is shown in FIG. 14 telescoped into a closed top end of cap 502 that is fitted over a brake cylinder 490. The brake cylinder 490 contains hydraulic fluid so that hydraulic fluid will be forced under pressure through actuator lines 504 and 506 into and through a transfer block 508. From the transfer block 508, fluid is passed through a brake line 510 to one of the brakes of a wheel 13 (FIG. 1). Movement of one of the center cables 478 responsive to a pivoting of brake pedal 27B and 27A moves one of the cranks 484 appropriately to pressurize or depressurize hydraulic fluid in one of the brake lines 84 to operate the brakes, not shown, on an individual main gear or wheel 13.

Hereinabove has been set out a preferred configuration of a rotor system 20 of the present invention as including a collective arm 30 for selective positioning by a pilot to apply a desired tension to the collective cable 39 which tensioning is opposed by coil springs 47 when not in flight and mainly be aerodynamic forces in flight. The collective cable 39 positioning thereby directly relates to rotor blade leading edge angle of attack or pitch angle. Further, where autogyro 10 has been shown set up from operation by a pilot, it should be understood that autogyro 10 could be configured for remote operation through appropriate inclusion of radio or remotely controlled servo motors for operating the aircraft as a remote piloted vehicle (RPV) within the scope of this disclosure. Accordingly, where preferred embodiments of a rotor system and the collective arm have been shown and described herein, it should be understood that variations are possible within the scope of this disclosure for providing a capability of selectively controlling the rotor blade angle of attack or pitch angle relative to the plane of the turning rotor blades. Therefore, while a preferred embodiment of the present invention has been shown and described herein, it should be understood that the present disclosure may be varied without departing from the subject matter coming within the scope of the following claims which claims we regard as our invention.

What is claimed is:

1. A rotor system for an autogyro aircraft that includes a frame with a fixed upright mast having a head end with a rotor system mounted thereon in freewheeling arrangement and with horizontal thrust provided to the aircraft by an engine turning a propeller, said rotor system comprising:

a spindle journaled to said head end of said fixed upright mast for rotation with respect to said mast, said spindle having an axis;

cheek plate means pivotably mounted to said spindle for sustaining non-symmetric lift forces;

left and right rotor blades, each having a leading edge, a longitudinal axis and a root end, each said rotor blade being pivotably mounted at said root end to said cheek plate means to extend away therefrom for creating lift, each said rotor blade being selectively tiltable about its respective said longitudinal axis to move said leading edge through an arc between a no-lift and a maximum lift attitude;

linkage means connected to said root ends for pivoting said left and right rotor blades equally;

a collective cable having a proximal end and a distal end, said distal end being connected to said linkage means for movement thereof in response to tension in said collective cable; and adjustment means attached to said collective cable for selectively applying and releasing said tension in said collective cable.

2. The rotor system of claim 1, wherein said linkage means further comprises:
  a left upper and a left lower teeter bar secured to said cheek plate means to extend outwardly therefrom for teetering therewith;
  a right upper and a right lower teeter bar secured to said cheek plate means to extend outwardly therefrom for teetering therewith;
  left pitch change horn means attached to said left upper and lower teeter bars for tilting said left rotor blade;
  right pitch change horn means attached to said right upper and lower teeter bars for tilting said right rotor blade;
  left blade bearing means connected to said left pitch change horn means and to said left upper and lower teeter bars for tiltably securing said left rotor blade to said left upper and lower teeter bars;
  right blade bearing means connected to said right pitch change horn means and to said right upper and lower teeter bars for tiltably securing said right rotor blade to said right upper and lower teeter bars;
  pitch change cross arm means rotatably secured to said distal end of said collective cable for axial movement therewith;
  left pitch link means secured between said left pitch change horn means and said pitch change cross arm means for tilting said left pitch change horn means in response to said axial movement of said pitch change cross arm means; and
  right pitch link means secured between said right pitch change horn means and said pitch change cross arm means for tilting said right pitch change horn means in response to said axial movement of said pitch change cross arm means.

3. The rotor system of claim 2, further comprising spring biasing means connected to said linkage means for resisting said axial movement of said pitch change cross arm means with said collective cable.

4. The rotor system of claim 3, wherein said spring bias means further comprises:
  right and left bolt means fitted transversely through said spindle and said cheek plate means for securing said cheek plate means to said spindle; and
  right and left coil spring means telescopingly fitted over said left and right bolt means respectively for opposing said tilting of said right and left pitch change horn means respectively in response to said axial movement of said pitch change cross arm means.

5. The rotor system of claim 4, wherein said right pitch link means further comprises:
  right first and second teeter bearing means slidably and rotatably journaled to said right bolt means, said right first and second teeter bearing means having juxtaposed faces in freely slidable contact with each other for transmitting uniaxial forces between said right pitch change horn means and said pitch change cross arm means during teetering of said cheek plate means with respect to said spindle;
  a right upper link connecting said pitch change cross arm means to said right first teeter bearing means; and
  a right lower link connecting said right second teeter bearing means to said right pitch change horn means;
  and wherein said left pitch link means further comprises:
  left first and second teeter bearing means slidably and rotatably journaled to said left bolt means, said left first and second teeter bearing means having juxtaposed faces in freely slidable contact with each other for transmitting uniaxial forces between said left pitch change horn means and said pitch change cross arm means during teetering of said cheek plate means with respect to said spindle;
  a left upper link connecting said pitch change cross arm means to said left first teeter bearing means; and
  a left lower link connecting said left second teeter bearing means to said left pitch change horn means.

6. A rotor system for an autogyro aircraft having a roll axis, a pitch axis and a yaw axis and having a fuselage with aircraft control systems therein operable by a user and with a fixed mast having a mast head end extending upwardly away therefrom for connecting to said rotor system in freewheeling arrangement at said mast head end, said rotor system comprising:
  a collective cable having a proximal end and a distal end, said collective cable being connected to said rotor system at said distal end;
  control means attached to said proximal end of said collective cable for controlling tension in said collective cable;
  a spindle rotatably secured to said mast, said spindle having an upper end and a lower end;
  cheek plate means tiltably coupled to said spindle for teetering with respect thereto;
  first and second teeter bar assemblies rigidly attached to said cheek plate means and extending therefrom in opposite directions for teetering therewith;
  a first rotor blade having a first root end, a first tip end and a first longitudinal axis extending therebetween, said first rotor blade being pivotably secured at said first root end to said first teeter bar assembly for rotating with said cheek plates and for pivoting with respect thereto between a no-lift and a maximum lift attitude;
  a second rotor blade having a second root end, a second tip end and a second longitudinal axis extending therebetween, said second rotor blade being pivotably secured at said second root end to said second teeter bar assembly for rotating with said cheek plates and for pivoting with respect thereto between said no-lift and said maximum lift attitude;
  said first teeter bar assembly further comprising first pitch change horn means attached to said first rotor blade at said first root end for pivoting said first rotor blade about said first longitudinal axis of said first rotor blade;
  said second teeter bar assembly further comprising second pitch change horn means attached to said second rotor blade at said second root end for pivoting said second rotor blade about said second longitudinal axis of said second rotor blade;
  a first blade bearing means secured to said first pitch change horn means and to said first teeter bar assembly for pivotably supporting said first rotor blade during said pivoting between said no-lift and said maximum lift attitude;

a second blade bearing means secured to said second pitch change horn means and to said second teeter bar assembly for pivotably supporting said second rotor blade during said pivoting between said no-lift and said maximum lift attitude;

a pitch change cross arm rotatably secured to said distal end of said collective cable for axial movement therewith; and linkage means connected between said pitch change cross arm, and said first and second pitch change horn means for pivoting said first rotor blade about said first longitudinal axis and pivoting said second rotor blade about said second longitudinal axis in response to said axial movement of said pitch change cross arm.

7. The rotor system of claim 6, wherein said control means further comprises:

axle means journaled to a frame of said aircraft;

a collective arm secured to said axle means for rotation therewith, said collective arm having a proximal end and a distal end;

tension connection means secured between said collective arm and said proximal end of said collective cable for applying said tension in said collective cable in response to said rotation of said collective arm; and ratchet means for selectively restraining and releasing said collective arm with respect to said rotation thereof.

8. The rotor system of claim 7, wherein said ratchet means further comprises:

an arcuate gear segment secured to said aircraft frame for supporting said collective arm against said tension in said collective cable;

and wherein said tension connection means further comprises:

means for securing said axle means to said collective arm intermediate the length of said collective arm; and yoke means secured between said proximal end of said collective cable and said axle means for moving said proximal end of collective cable in response to rotation of said axle means by said collective arm.

9. The rotor system of claim 8, wherein said ratchet means further comprises:

slide means slidably connected to said collective arm adjacent said distal end thereof for engaging said arcuate gear segment to selectively restrain said rotation of said collective arm with respect to said arcuate gear segment; and biasing means operably associated with said slide means for urging said slide means toward said arcuate gear segment.

10. The rotor system of claim 9, wherein said control means further comprises:

button means extending outwardly from said proximal end of said collective arm for opposing the action of said biasing means, said button means being configured for movement by a user;

button connection means connecting said button means to said slide means for moving said slide means in response to said movement of said button by a user;

and said biasing means further comprises:

a coil spring positioned proximate said button means for urging said button means outward from said proximal end of said collective arm.

11. The rotor system of claim 6, further comprising:

a rotor retaining bolt plate tiltably secured to said mast head end for tilting about said roll axis and said pitch axis; and rotor bearing means positioned proximate said rotor retaining bolt plate and said spindle for reducing friction associated with rotation of said spindle with respect to said rotor retaining bolt plate.

12. The rotor system of claim 11, further comprising:

a rotor retaining bolt positioned to penetrate said rotor retaining bolt plate, said spindle and said rotor bearing means for rotatably securing said rotor system to said mast head end; and a longitudinal center passage formed through said rotor retaining bolt for receiving said distal end of said collective cable.

13. The rotor system of claim 12, further comprising:

a collective cable termination secured to said distal end of said collective cable and keyed to fit in sliding arrangement within said longitudinal center passage; and cross arm connection means rotatably secured to said collective cable termination and said pitch change cross arm for moving said pitch change cross arm axially with said collective cable termination while freeing said pitch change cross arm for rotation with respect to said collective cable termination.

14. The rotor system of claim 6, wherein said first teeter bar assembly further comprises:

a first upper and a first lower teeter bar disposed substantially parallel to each other and extending away from said cheek plate means; and first horn connection means attached to said first pitch change horn means for tiltably mounting said first pitch change horn means and said first root end to said first teeter bar assembly;

and wherein said second teeter bar assembly further comprises:

a second upper and a second lower teeter bar disposed substantially parallel to each other and extending away from said cheek plate means; and second horn connection means attached to said second pitch change horn means for tiltably mounting said second pitch change horn means and said second root end to said second teeter bar assembly.

15. The rotor system of claim 14, wherein said first pitch change horn means further comprises:

a first top pitch change horn plate and a first bottom pitch change horn plate each being secured to and extending away from said first rotor blade and terminating in a coplanar arm angled to extend parallel to said longitudinal axis of said first rotor blade;

and wherein said second pitch change horn means further comprises:

a second top pitch change horn plate and a second bottom pitch change horn plate each being secured to and extending away from said second rotor blade and terminating in a coplanar arm angled to extend parallel to said longitudinal axis of said second rotor blade.

16. The rotor system of claim 15, wherein said first and second blade bearing means are each comprised of a plurality of spherical bearings.

* * * * *